(12) United States Patent
Derby et al.

(10) Patent No.: US 7,233,733 B2
(45) Date of Patent: Jun. 19, 2007

(54) METHOD AND SYSTEM FOR FINDING EVOLVING REGIONS IN GRAPHS WITHOUT PERSISTENT NODE IDENTITY

(75) Inventors: Herbert G. Derby, Yorktown Heights, NY (US); Nicholas M. Mitchell, White Plains, NY (US); Indrajit Poddar, Coraopolis, PA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 11/180,445

(22) Filed: Jul. 13, 2005

(65) Prior Publication Data

US 2007/0016898 A1    Jan. 18, 2007

(51) Int. Cl.
*G02B 6/00* (2006.01)
*G06F 9/45* (2006.01)
(52) U.S. Cl. ...................................... 385/147; 700/144
(58) Field of Classification Search ...................... None
See application file for complete search history.

(56) References Cited

U.S. PATENT DOCUMENTS

2006/0150168 A1* 7/2006 Mitchell et al. ............ 717/156

* cited by examiner

*Primary Examiner*—Sung Pak
*Assistant Examiner*—Tina M. Wong
(74) *Attorney, Agent, or Firm*—Casey August; Jose Gutman; Fleit Kain Gibbons Gutman Bongini & Bianco P.L.

(57) ABSTRACT

A system, method, and computer program for identifying evolving regions in a graph of interrelated nodes representing a computer system environment. The method includes generating a series of samples (302) of the environment. Each sample includes a plurality of interrelated nodes (502) and at least one edge (504) classified into a plurality of at least one of node type and edge type, respectively. A summary (900) of the plurality of at least one of node type (502) and edge type (504) is created for the series of samples (302). A summary instance (312) of the summary (900) is created for each sample. At least one summary instance (312) is compared to at least one subsequent summary instance (314) and at least one result (318) is stored in memory (106). A successive behavior is characterized for one or more of the at least one of the node type and the edge type.

20 Claims, 25 Drawing Sheets

METHOD AND SYSTEM FOR FINDING EVOLVING REGIONS IN GRAPHS WITHOUT PERSISTENT NODE IDENTITY

FIELD OF THE INVENTION

The present invention generally relates to the field of information processing system environments, and more particularly relates to analyzing how these environments evolve.

BACKGROUND OF THE INVENTION

Analyzing how an environment of a computer system is evolving is essential to ensure reliable and optimal performance from the system. One way of representing the evolution of the system is by using a visual medium such as a graph. For example, a graph can represent snapshots of live objects such as memory, processor, network, or other system resources in a running computer system. A common challenge when using graphs is identifying subsets of graphs that are growing without bound. These graph subsets may eventually cause the system to crash when it exceeds available system resources, such as memory. This problem is known as a memory leak.

Prior art systems have implemented various techniques to address the above graph evolution analysis problem. However, these techniques cannot be applied in many important runtime environments, for example, Java environments, that have restrictions on data collection and environment analysis. The limitations of the prior art are especially evident when analyzing deployed programs. In this setting, there are certain operations that prior art techniques are restricted from performing and many times the assumptions used by the prior art techniques are invalid.

One common restriction of graph evolution analysis is that snapshots of evolving graphs that are analyzed are taken at widely spaced intervals. For example, when analyzing the memory of Java programs, snapshots are usually taken hours apart. These long intervals ensure that a sufficiently long period of evolution is captured, especially when the evolution is slow or intermittent. Long intervals between snapshots are also important if there are other evolutions occurring concurrently with the problematic one. If the interval is too short, the evolution of interest may be drowned out in the background noise of other evolutions. Another common restriction is that the analysis of the program should be performed while the program is executing in its native environment. When a program is executed in a clean-room setting, reproducing the problems of interest during the program's execution is very difficult or impossible.

These restrictions imply that evolution analysis techniques cannot assume that graph nodes have unique and persistent identities. However, prior art techniques have carried these assumptions. These assumptions are difficult to enforce because they impose a large space and time overhead on the program's execution. Some prior art systems have implemented techniques that only assume, without enforcing, persistent identity. These prior art techniques have none of the overhead, but will produce incorrect results when nodes are renamed, for example, by a garbage collector.

Another problem is that prior art techniques that enforce persistent identity usually require modification of the way a program behaves as it executes. The restrictions discussed above, require that on deployed applications these techniques cannot modify how the program behaves as it executes, especially when executing in its native environment.

Yet, another problem is that programs typically have other concurrent mechanisms that periodically rename graph nodes. So even if snapshots were taken over a short enough interval and the overheads confined to that interval, the overheads of persistent identity still cannot be tolerated. For example, in Java, the garbage collector routinely moves objects around, therefore causing the object's address to periodically change. If the renaming period is shorter than the period from first snapshot acquisition to the last snapshot acquisition, persistent objects names are not yielded. To address these naming issues in Java, the header of each object could be augmented with a 64-bit identifier, or the garbage collector could be augmented to notify the analyzing application when an object is renamed. However, these naming strategies have space, time, and configuration implications that limit their applicability to deployed settings. Furthermore, their impact is not confined to the duration of analysis, e.g. if one adds 64 bits to each object, that impact is felt throughout that execution of the program.

Another problem is that the prior art systems for evolution analysis assume persistent node identity. Some techniques, known, collectively as "snapshot differencing" operate as follows. Two snapshots are taken and aligned by corresponding the nodes in the second snapshot with the nodes in the first snapshot. Then an interactive picture of the difference is drawn. For example, the interactive picture shows that a node previously had outgoing edges pointing to two nodes of a certain color and now the node points to three such colored nodes. These differencing techniques only work if nodes can be aligned and the prior art techniques do so by assuming and sometimes enforcing persistent node identity.

Additionally, some prior art systems, in addition to assuming and enforcing persistent node identity provide mechanisms for removing false positives. However, a critical step in false positive removal does not adhere to the in-production restriction discussed above. The validation mechanism operates by taking the generated patterns and modifying the program so as to keep track of how many times each pattern is matched as the program runs. However, this technique does not adhere to the restrictions discussed above because it modifies the program's normal execution.

Therefore a need exists to overcome the problems with the prior art as discussed above.

SUMMARY OF THE INVENTION

Briefly, in accordance with the present invention, disclosed are a system, method, and computer program product on an information processing system for identifying at least one evolving region in a graph of interrelated nodes representing an evolving computer system environment. The method comprises generating a series of samples of an evolving computer system environment. Each sample in the series of samples includes a plurality of interrelated nodes that are classified into a plurality of at least one of a node type and an edge type, respectively. A summary of the plurality of at least one of the plurality of node types and a plurality of edge types is created for the series of samples. The summary summarizes at least one of all node types and all edge types in the series of samples. An instance of the summary is created for each sample by summarizing at least one of all node types and all edge types in the series of samples. At least one instance of the created instances of the summary is stored in memory. At least one instance of the summary is compared to at least one subsequent instance of the summary. At least one result from comparing the instances of the summary is stored in memory. At least one sample of the evolving computer system environment is associated with the stored comparison results to characterize a successive behavior of the evolving computer system environment for one or more of the at least one of the node type and the edge type.

In another embodiment of the present invention a system for estimating how regions in a graph of interrelated nodes representing an evolving computer system environment are evolving is disclosed. The system comprises a memory and an information processing unit that is communicatively coupled to the memory. An environment analyzing tool is communicatively coupled to the memory and the information processing unit. The environment analyzing tool comprises a sample generator for generating a series of samples of an evolving computer system environment. A node classifier is also included in the environment analyzing tool for classifying a plurality of interrelated nodes in each of the samples into a plurality of at least one of a node type and an edge type. A summarizer creates a summary of the plurality of interrelated nodes and at least one edge for the series of samples. The summary is stored in memory. A comparator for comparing at least one instance of the summary to at least one subsequent instance of the summary is also included. The environment analysis tool also comprises a pattern generator for determining at least one pattern of evolution of at least one region in the computer system. The at least one pattern of evolution is based on at least the summary of the plurality of node types for the series of samples.

In yet another embodiment of the present invention, a computer readable medium including computer instructions for identifying at least one evolving region in a graph of interrelated nodes representing an evolving computer system environment is disclosed. The instructions on the computer readable medium include instructions for generating a series of samples of an evolving computer system environment. Each sample in the series of samples includes a plurality of interrelated nodes that are classified into a plurality of at least one of a node type and an edge type, respectively. A summary of the plurality of at least one of the plurality of node types and a plurality of edge types is created for the series of samples. The summary summarizes at least one of all node types and all edge types in the series of samples. An instance of the summary is created for each sample by summarizing at least one of all node types and all edge types in the series of samples. At least one instance of the created instances of the summary is stored in memory. At least one instance of the summary is compared to at least one subsequent instance of the summary. At least one result from comparing the instances of the summary is stored in memory. At least one sample of the evolving computer system environment is associated with the stored comparison results to characterize a successive behavior of the evolving computer system environment for one or more of the at least one of the node type and the edge type.

One advantage of the foregoing embodiments of the present invention is that accurate estimates or patterns of how an environment in a computer system is evolving are created from a minimal amount of information. Persistent node identity does not need to be assumed or enforced, thereby reducing system overhead when analyzing an environment in the computer system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by categorizing nodes residing across multiple graphs into a plurality node types that are persistent across the multiple graphs. The minimal amount of information needed to create accurate patterns of evolution reduces system overhead and allows the present invention to be applied to various types of environments.

Figure 1:
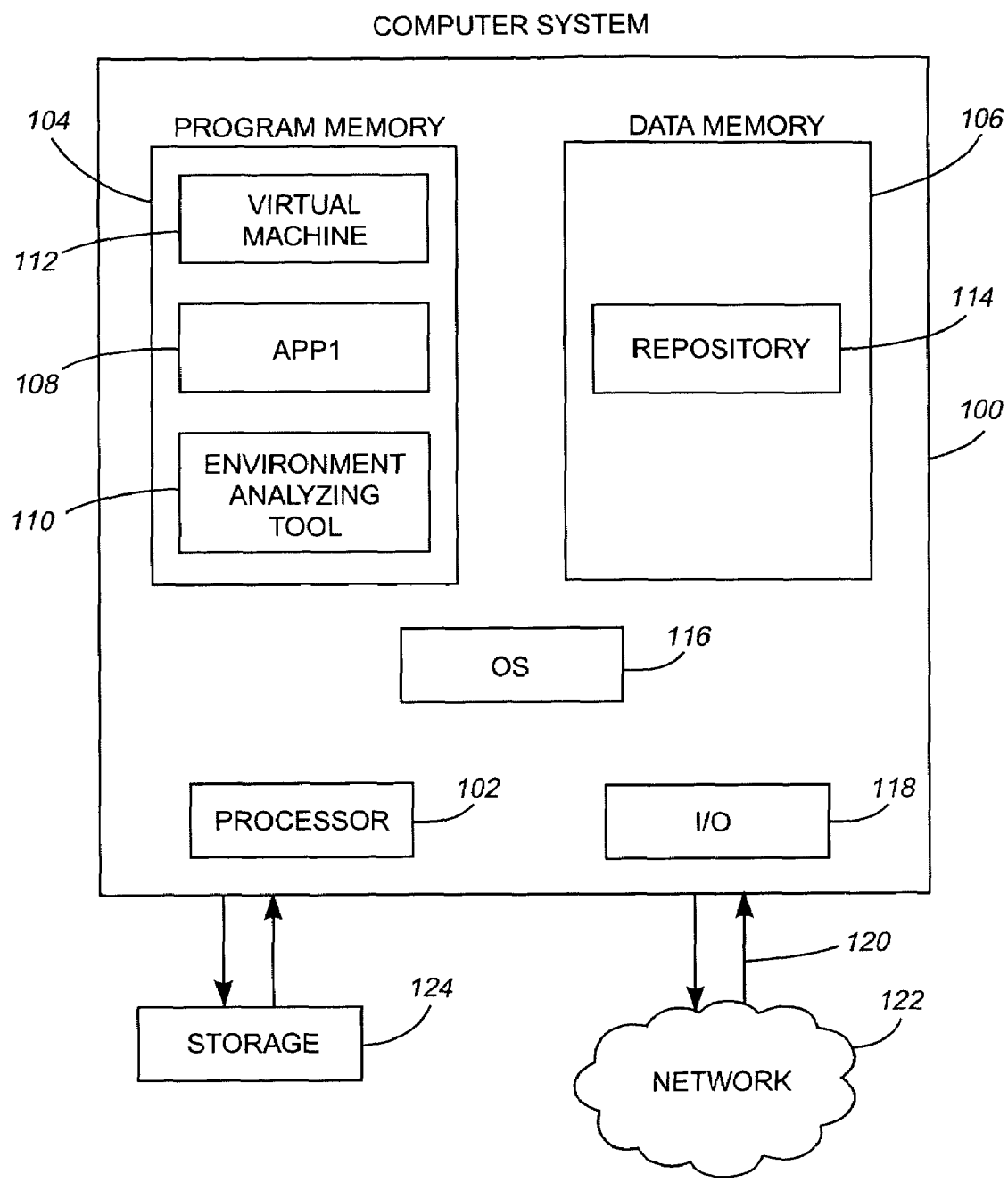
FIG. 1 is a block diagram illustrating a computer system according to an embodiment of the present invention.

According to an embodiment of the present invention, as shown in FIG. 1, an exemplary computer system 100 is illustrated. FIG. 1 shows a computer system 100 comprising an information processing unit 102, e.g. a processor that is communicatively coupled to a program memory 104 and a data memory 106. The processor 102 processes instructions, performs calculations, and manages the flow of information through the computer system 100. The processor 102, in one embodiment, is also communicatively coupled to a removable media drive (not shown), such as a CD-ROM drive, floppy drive, or the like, that is compatible with a computer readable medium (not shown).

The program memory 102 includes at least one program, application 108, for the computer system 100 that is, for example, running or waiting to be executed. An optional execution environment 112, for example, a virtual machine, is also included in the program memory 104. The program memory 104 also includes an environment analyzing tool 110. The environment analyzing tool 110 analyzes how an environment of the computer system 100 is evolving and will be discussed in greater detail below.

The data memory 106 optionally includes a repository 114. The optional repository 114 may be used to store a series of samples $S_1$–$S_n$ 302 (FIG. 3) of an environment of the computer system 100. The optional repository 114 also may reside in a section of the data memory 106 that is persistent, that is, the data residing in the persistent memory section of the data memory 106 is not lost when power is turned off from the computer system 100. The data memory 106, for example, is non-volatile RAM, a hard disk drive, or the like.

The computer system 100 also includes an operating system platform 116 and glue software (not shown). The operating system platform 116 manages resources, such as the data stored in data memory 106, the scheduling of tasks, and processes the operation of the applications 108 in the program memory 104. The operating system platform 116 also manages various input/output interfaces and devices represented by the input/output block 118. For example, in one embodiment, an input/output interface is a graphical display interface for displaying information to a user (not shown), a user input interface (not shown) that receives inputs from a keyboard (not shown) and a pointing device (not shown), and communication network interfaces (not shown) for communication with a network link 120. Additionally, the operating system platform 116 also manages many other basic tasks of the computer system 100 in a manner well known to those of ordinary skill in the art.

Glue software (not shown) may include drivers, stacks, and low level application programming interfaces (API's) and provide basic functional components for use by the operating system platform 116 and by compatible applications that run on the operating system platform 116 for managing communications with resources and processes in the computer system 100.

The network link 120 links the computer system 100 to a network 122. The network 122, for example, is a LAN, WAN, World Wide Web, wireless network, or the like. The computer system 100 is also communicatively coupled to a storage device 124, for example, a CD-ROM, external hard drive, USB drive, floppy drive, Flash memory, or the like. The computer system 100 reads and/or writes data to the storage device 124.

Figure 2:
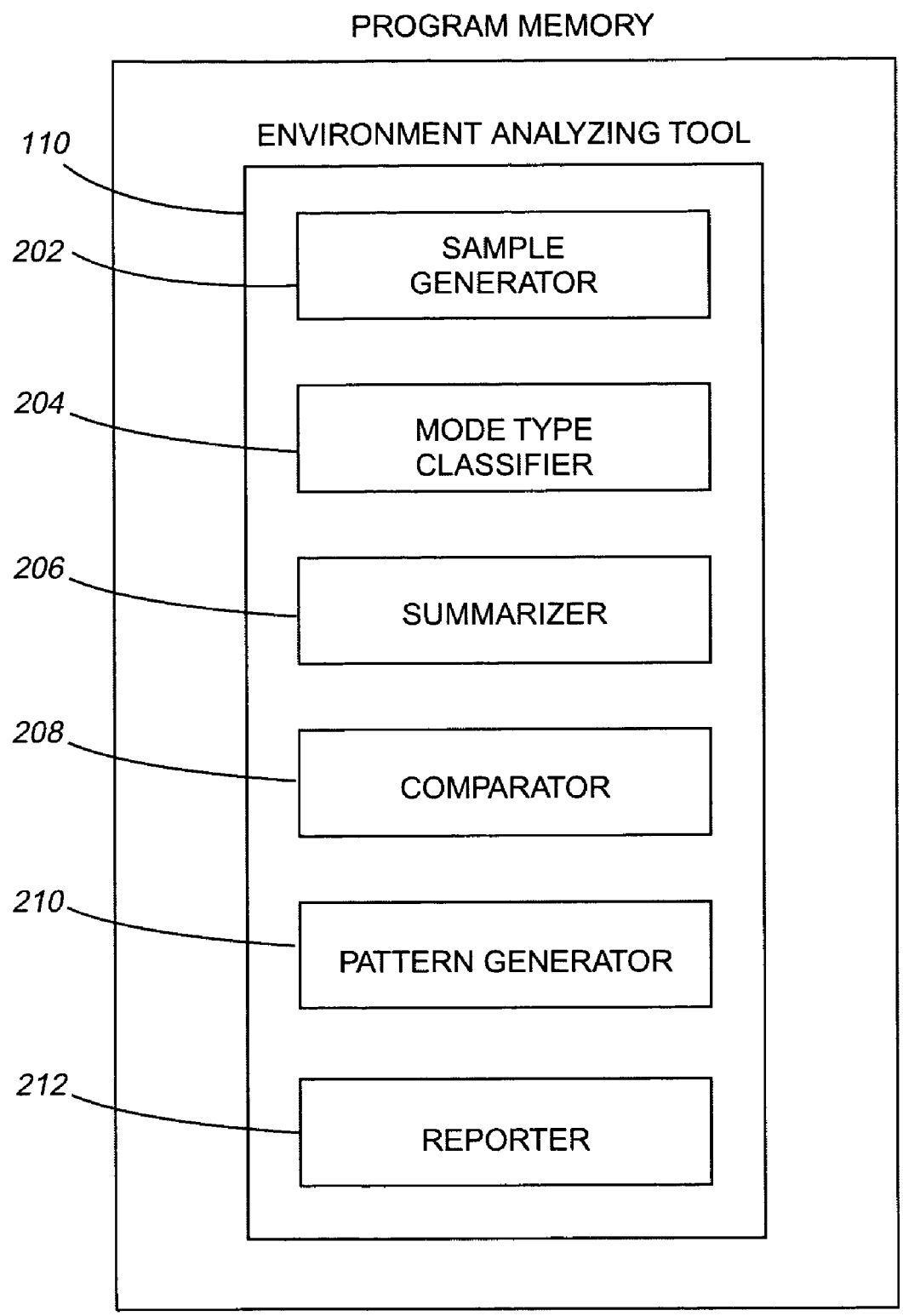
FIG. 2 is a block diagram illustrating a more detailed view of the environment analyzing tool of FIG. 1.

FIG. 2 shows a more detailed view of the program memory 104 and the environment analyzing tool 110 in FIG. 1. The program memory 104 further includes a sample generator 202 for generating a series of samples $S_1$–$S_n$ 302 (FIG. 3) of an evolving environment of the computer system 100. The evolving environment, in one embodiment is an executing application, computer network, or the like. Each sample includes a plurality of interrelated nodes. The series generator 202, the series of samples $S_1$–$S_n$ 302 (FIG. 3), and the nodes will be discussed in greater detail below. A node classifier 204, for classifying the nodes into node types, edge types, or the like, is communicatively coupled to the sample generator 202 and will be discussed in greater detail below.

Figure 3:
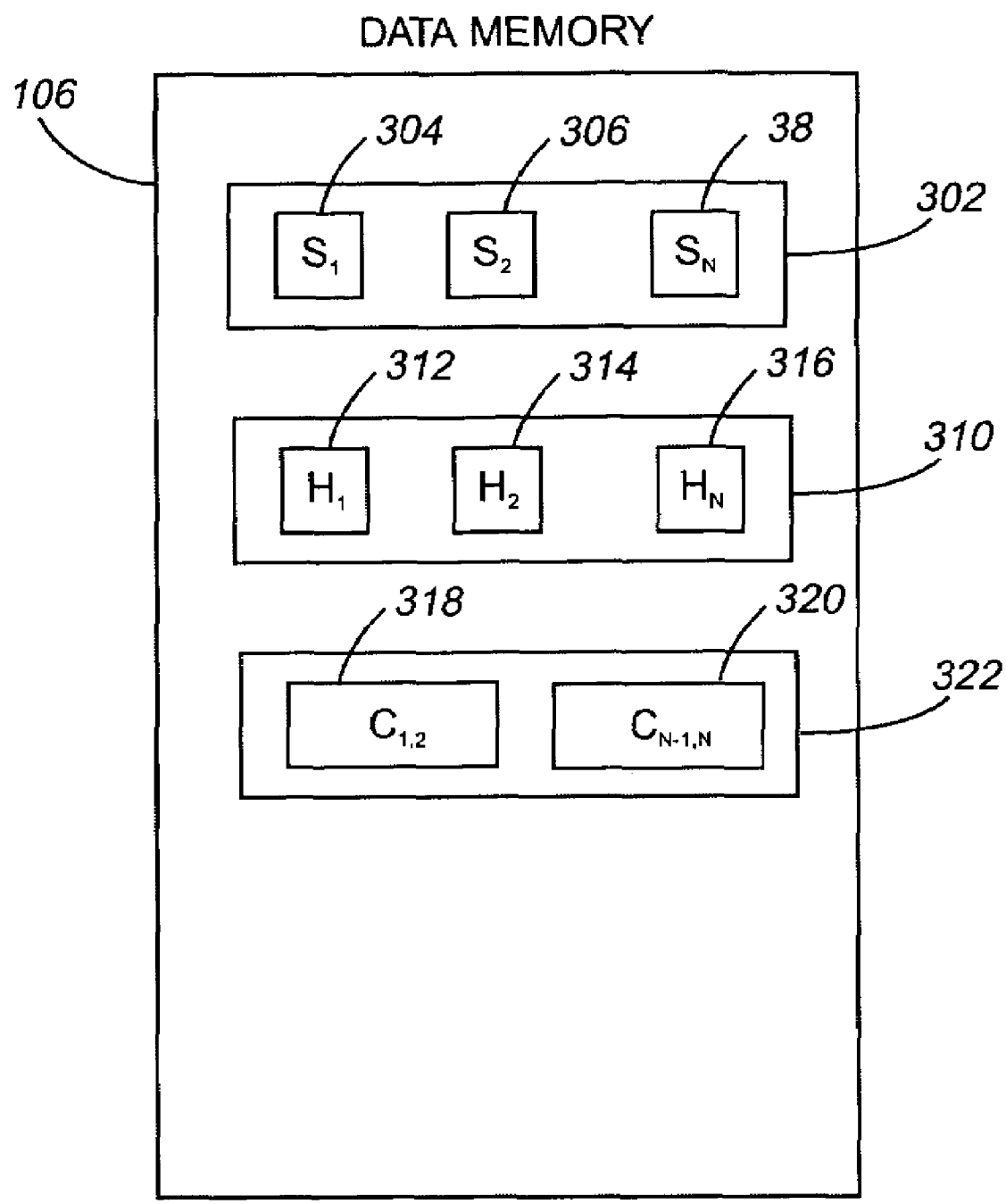
FIG. 3 is a block diagram illustrating a more detailed view of the data memory of FIG. 1.

A summarizer 206 is also communicatively coupled to the sample generator 202 for creating summary information 900 (FIG. 9) summarizing the node types in the series of the samples $S_1$–$S_n$ 302 (FIG. 3).

A comparator 208 is also included in the environment analyzing tool 110 for comparing at least one summary instance $H_1$ 312 (FIG. 3) with at least one subsequent summary instance $H_2$ 314 (FIG. 3). In one embodiment, the summary information 900 (FIG. 9) is a histogram and the summary instances $H_1$–$H_n$ 310 (FIG. 3) are histogram instances. From this point forward the summary information 900 (FIG. 9) and the summary instances $H_1$–$H_n$ 310 (FIG. 3) will be referred to as the histogram 900 and histogram instances $H_1$–$H_n$ 310 (FIG. 3). However, the present invention is not limited to having the summary information and summary instances in the form of a histogram and histogram instances.

The environment analyzing tool 110 also includes a pattern generator 210 for generating patterns of environment evolution. A reporter 212 is also included in the environment analyzing tool 110 for reporting the results of the pattern generator 210 to a user.

FIG. 3 is a more detailed view of the data memory 106 in FIG. 1. The first block 302 represents the series of samples $S_1$–$S_n$ 302 generated by the sample generator 202. For example, each sample 304, 306, 308 generated is stored in the data memory 106. The second block 310 represents each instance 312, 314, 316 of the histogram 900 (FIG. 9) created by the summarizer 206. An instance 312 of the histogram 900 (FIG. 9), for example, is the histogram 900 (FIG. 9) summarizing the node types in a sample in the series of samples $S_1$–$S_n$ 302. The data memory 106 also includes the results $C_{1,2}$–$C_{n-1,n}$ 318, 320 of the comparator 208 as represented by the third block 322.

Figure 4:
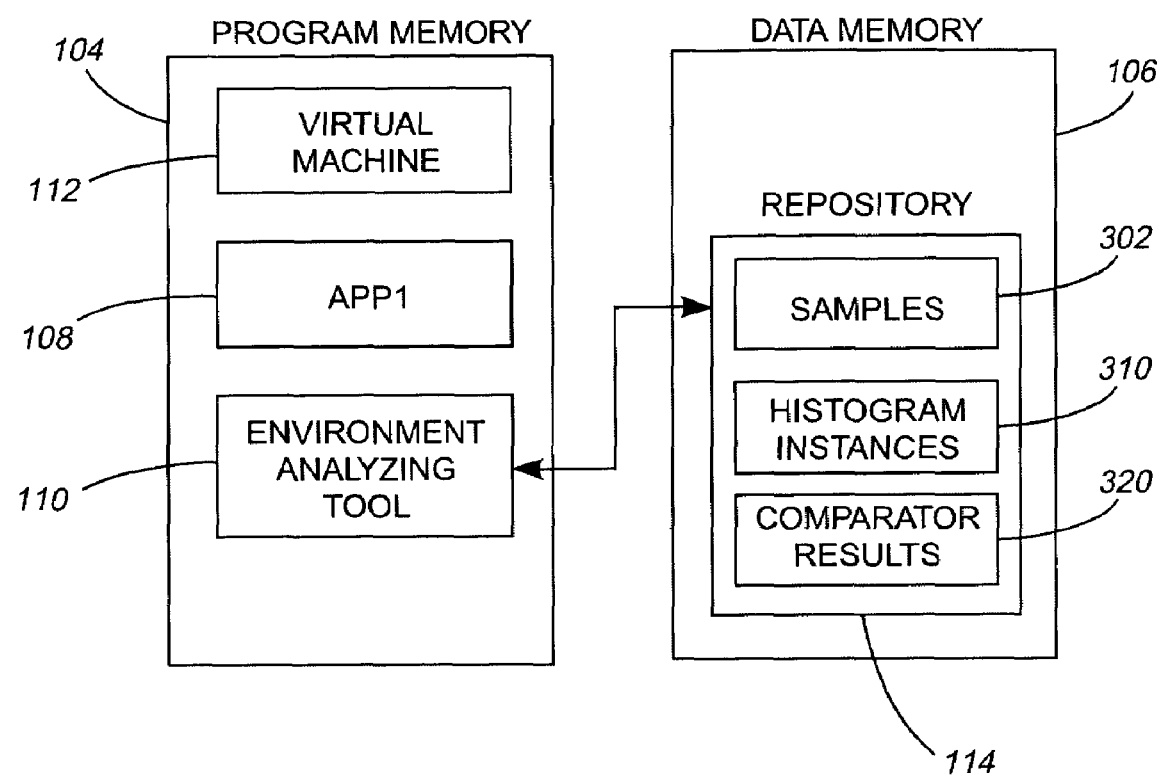
FIG. 4 is a block diagram illustrating the interrelationship between the environment analyzing tool and the optional repository of FIG. 1.

FIG. 4 shows the relationship between the environment analyzing tool 110 and the data memory 106. In one embodiment, the environment analyzing tool 110 is communicatively coupled to the optional repository 114. The environment analyzing tool 110 communicates with the optional repository 114 for storing and retrieving information used to generate patterns regarding how the environment is evolving. In another embodiment the samples 302, histogram instances 310, and comparator results 322 are not stored in the optional repository 114. The environment analyzing tool 110 communicates with the data memory 106 to directly store and retrieve information from the data memory 106 used to generate patterns regarding how the environment is evolving.

Figure 5:
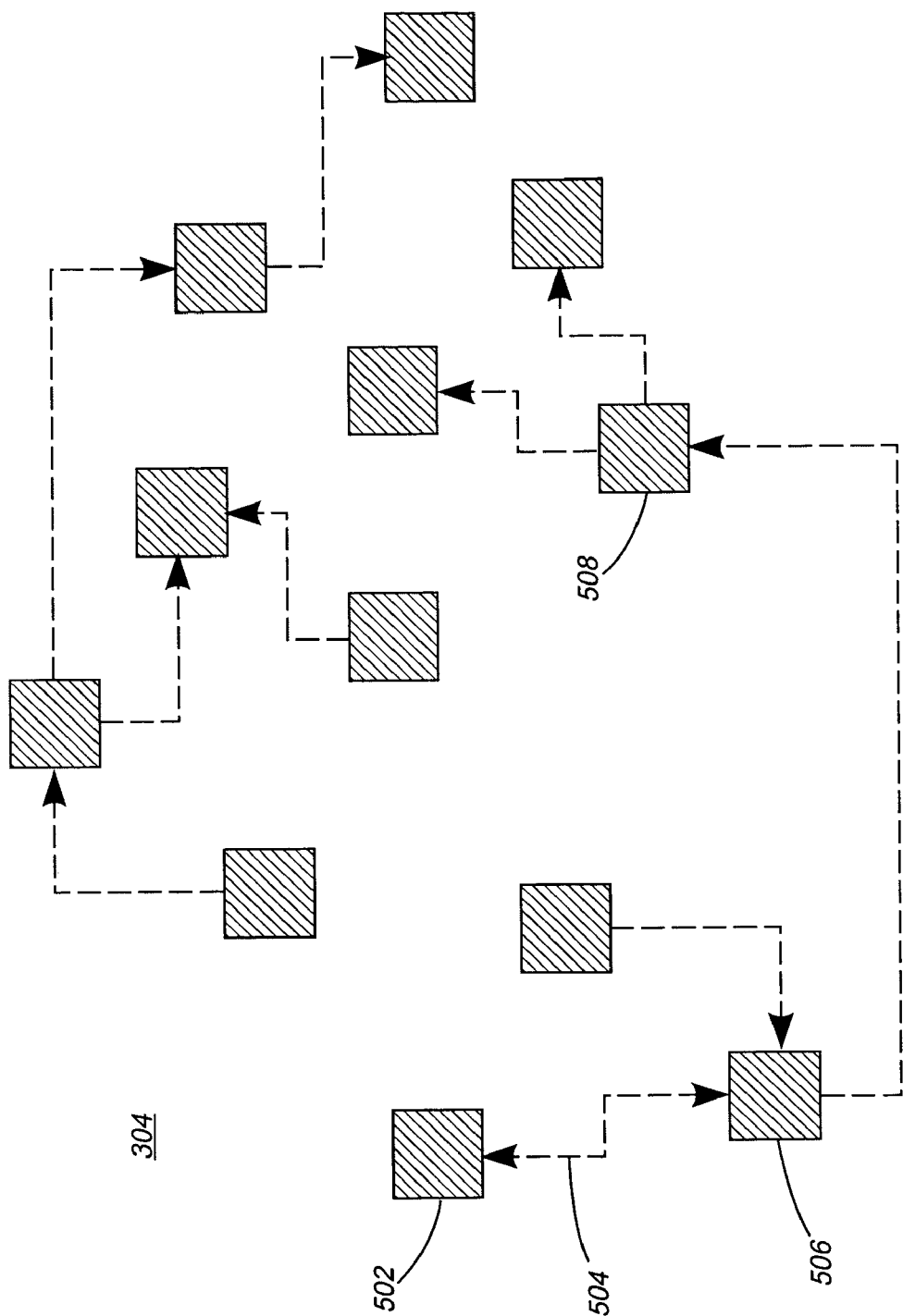
FIG. 5 is a graph illustrating a first sample of an evolving computer system environment, according to an embodiment of the present invention.

FIG. 5 shows a more detailed view of the sample $S_1$ 304 in FIG. 3. In one embodiment, the first sample $S_1$ 304 is a snapshot of the state of an environment in the computer system 100. For example, the sample $S_1$ 304 can be a snapshot of live objects in a Java program at the time the snapshot was taken. Live objects are objects that have not yet been collected, nor are collectible, by a garbage collector. The snapshot represents the objects in the environment being analyzed in graph form, as illustrated in FIG. 5. The graph shows the reference relationships between the objects. From this point forward, the term "sample" will be used interchangeably with "graph" and "snapshot", according to an embodiment of the present invention. However, the present invention is not limited to the samples being in the form of a graph or a snapshot being the same as the sample.

The sample $S_1$ 304 includes nodes, such as node 502, node 506, node 508, and other nodes shown, and edges, such as edge 504, and other such edges. Nodes, such as node 502, for example, represent the objects in the environment being analyzed. An object, for example can be a specific variable in a Java program, a function in source code, a network resource in a computer network, computer memory, processor utilization, or the like. The sample $S_1$ 304 also shows, for example, a first edge 504 represented by one or more arrows interconnecting nodes. Edges illustrate the reference relationship between the nodes. For example, a node 502 points to a node 506, which points back to the node 502 as illustrated by the two-headed arrow of the edge 504.

Samples of the environment are taken to analyze the environment and generate patterns on how the environment is evolving. The samples, in one embodiment, are used to explore how, for example, portions of the graph may be evolving. A graph's evolution can be display and analyzed in a number of ways. It is rarely sufficient to explain a graph's evolution in terms of high-level aggregate summaries. For example, knowing that the graph is changing by the addition of nodes of a certain color does not explain the locations in the graph in which these nodes are being added. It is very often necessary to know this context information. In one embodiment, a "region" of a graph is a subgraph of nodes of the same type, in roughly equivalent context. This is helpful because objects of the same type, and in the same context are likely to be there, and to evolve, due to the same impetus, for example, the same code in a Java program. A region evolves, for example, when elements are added to, removed from, and/or re-linked within the region. An important aspect of a region is that all of its elements/constituents co-evolve, in that they exhibit the same kind of evolution, for example, monotonic growth.

Figure 6:
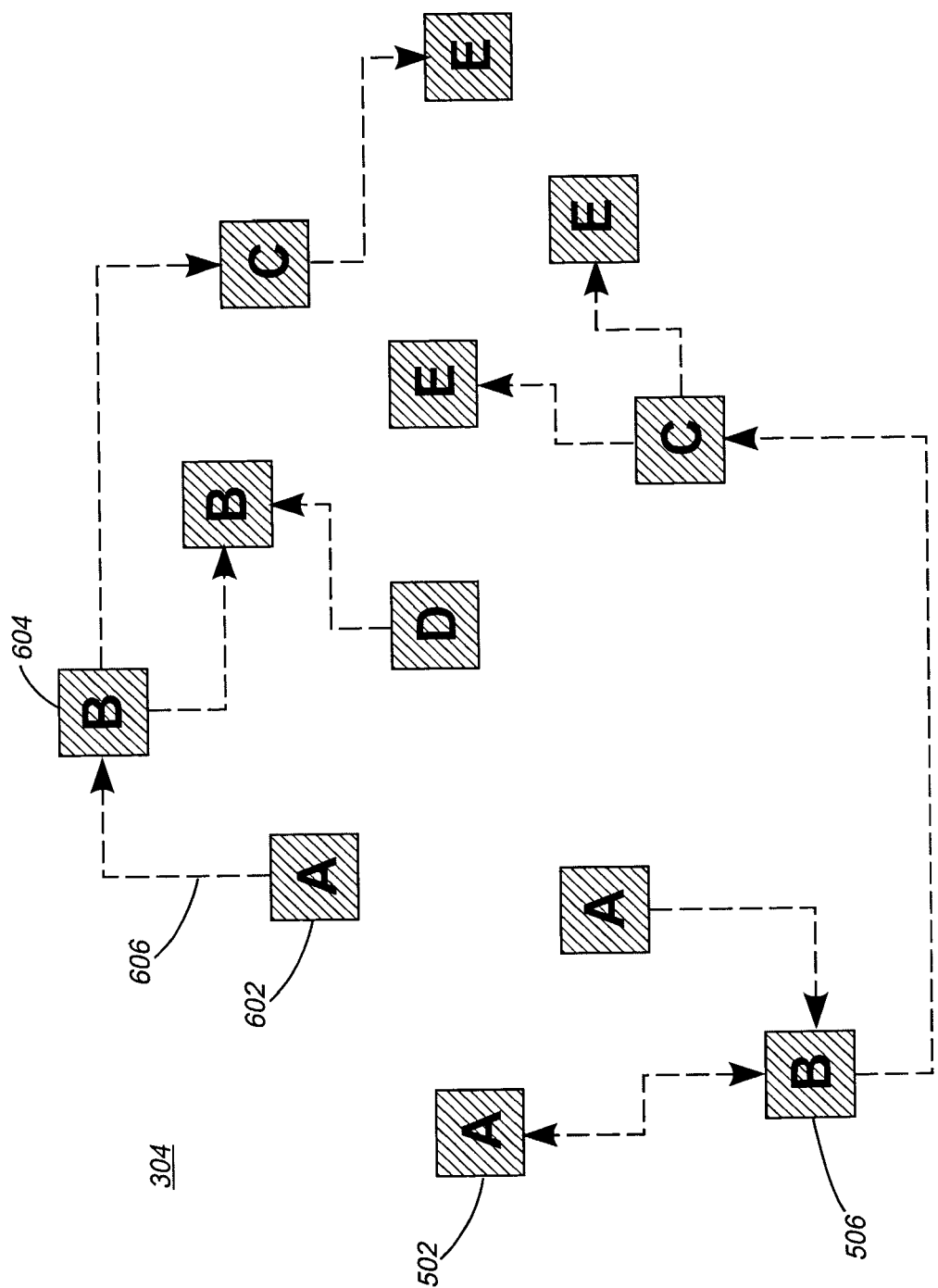
FIG. 6 is a graph illustrating nodes in the sample of FIG. 5 represented as node types.

FIG. 6 shows the first sample $S_1$ 304 of FIG. 5 with each node classified into one of a plurality of node types represented by letters A, B, C, D, and E. For example, a node 502 is classified into node type A and the node 506 is classified into node type B. In one embodiment of the present invention, a node type is an object type of the object represented by the node. For example, the node 502 may be a specific string in a Java program and is therefore, represented in the first sample $S_1$ 304 as a node of the node type String. The node 506 may be a specific list in a Java program and is therefore, represented in the first sample $S_1$ 304 as the node type List. Also, the node types are persistent throughout time. In other words, a node that is classified as a String will always be a String in each subsequent sample taken of the evolving environment. Therefore, even if the node is renamed, for example, by a garbage collector the node type will remain the same. In another embodiment, the node types are represented by colors, numbers, alphanumeric strings, or the like. In yet another embodiment of the present invention, the nodes are classified by edge types. For example, a node 602 of type A points to node 604 of type B, that is, there is an edge 606 from node 602 to node 604.

One advantage of the present invention is that by using node types, which are persistent throughout the series of samples $S_1$–$S_n$ 302, the problems of assuming and enforcing persistent node identities are avoided. Program modification, which is required when assuming and enforcing persistent node identity, is not required when using persistent node types. Also, maintaining the identity of node types over time requires little overhead as compared to the prior art techniques.

Figure 7:
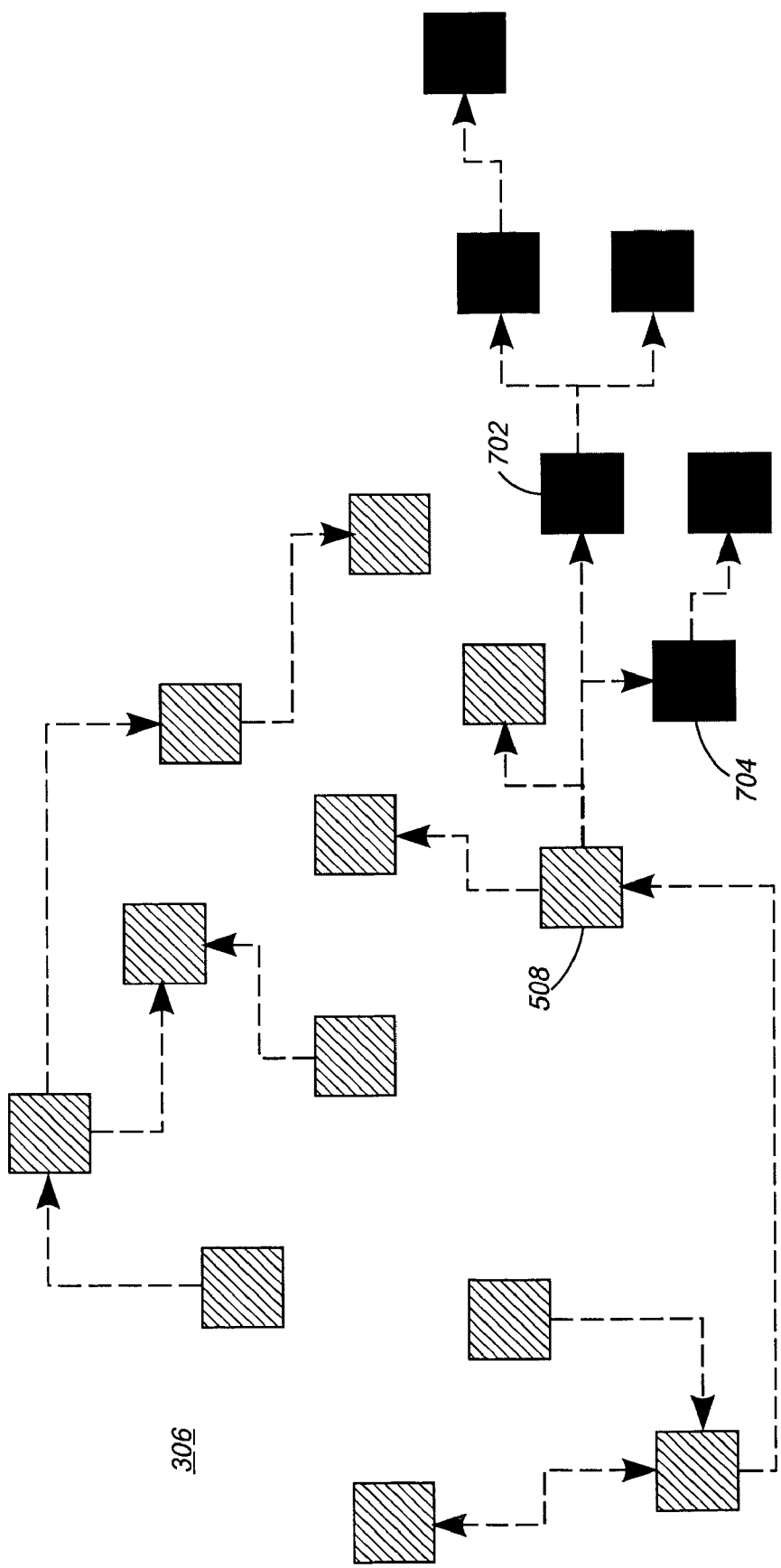
FIG. 7 is a graph illustrating a second sample of the evolving computer system environment, according to an embodiment of the present invention.
Figure 8:
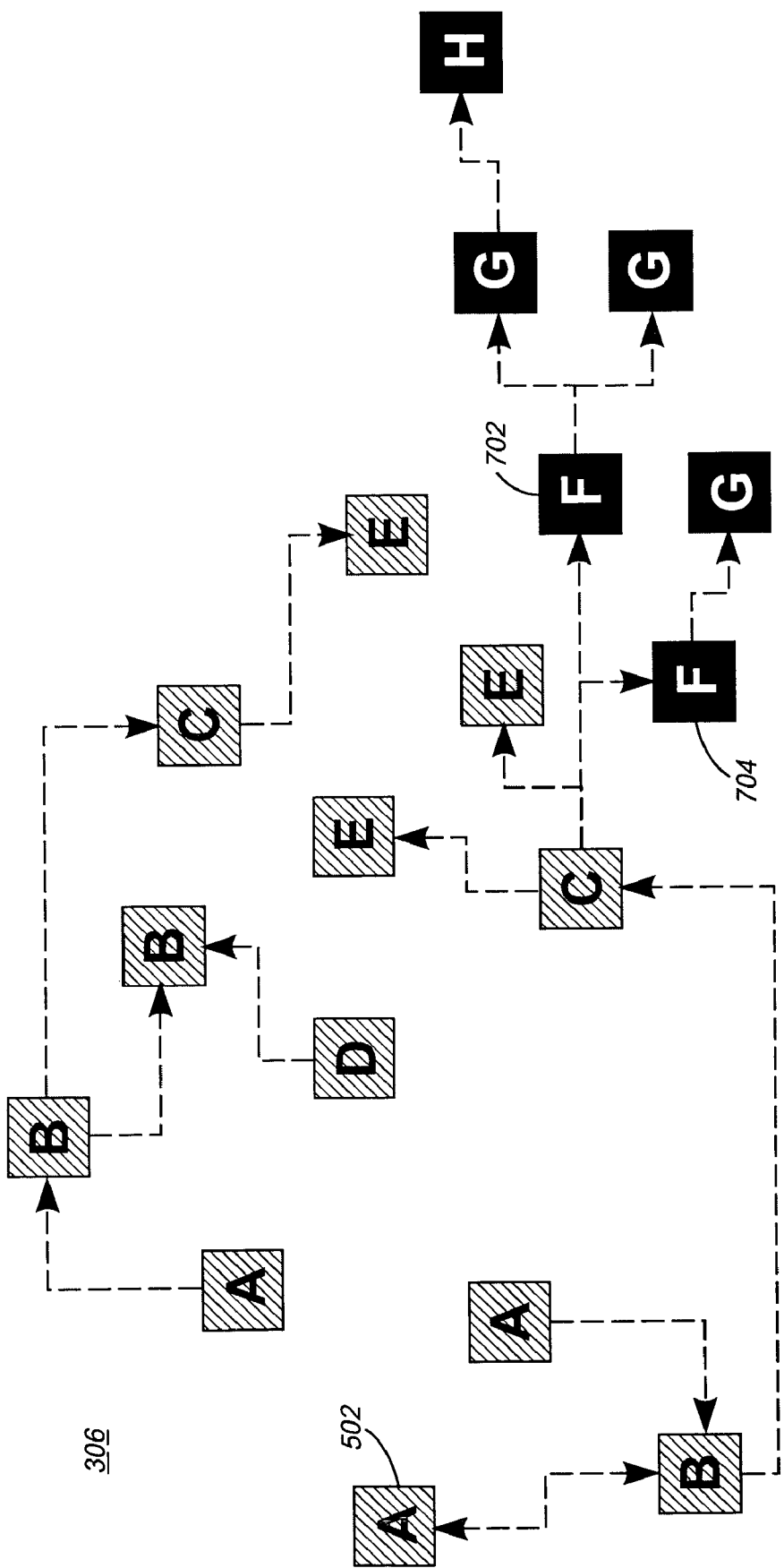
FIG. 8 is a graph illustrating the nodes in the sample of FIG. 7 represented as node types.

FIG. 7 shows a second sample $S_2$ 306 of the evolving environment of the computer system 100. The second sample $S_2$ 306 is a sample taken of the environment at a point in time after the first sample $S_1$ 304 was taken. FIG. 7 shows that new nodes, which are represented by the solid grey boxes, exist in the environment. For example, a new node 702 and a new node 704 are considered added nodes because they did not exist in the first sample $S_1$ 304. Also, FIG. 7 shows that the region whose owner proxy is node 508, which points to the new node 702 and the new node 704, may be evolving since new nodes have been added. An owner proxy is the first non-changing node that dominates new nodes and will be discussed in greater detail below FIG. 8 shows the new nodes in the second sample $S_2$ 306 classified into node types. Because each of the added nodes, for example nodes 702, 704, is of a different type than the nodes in the first sample $S_1$ 304, the new nodes are given new node types. For example, the new node 702 is classified as being node type F. The node types of the first sample $S_1$ 304 remain the same because they are persistent throughout each sample. For example, the node 502 remained a node type A from the first sample $S_1$ 304 to the second sample $S_2$ 306.

Figure 9:
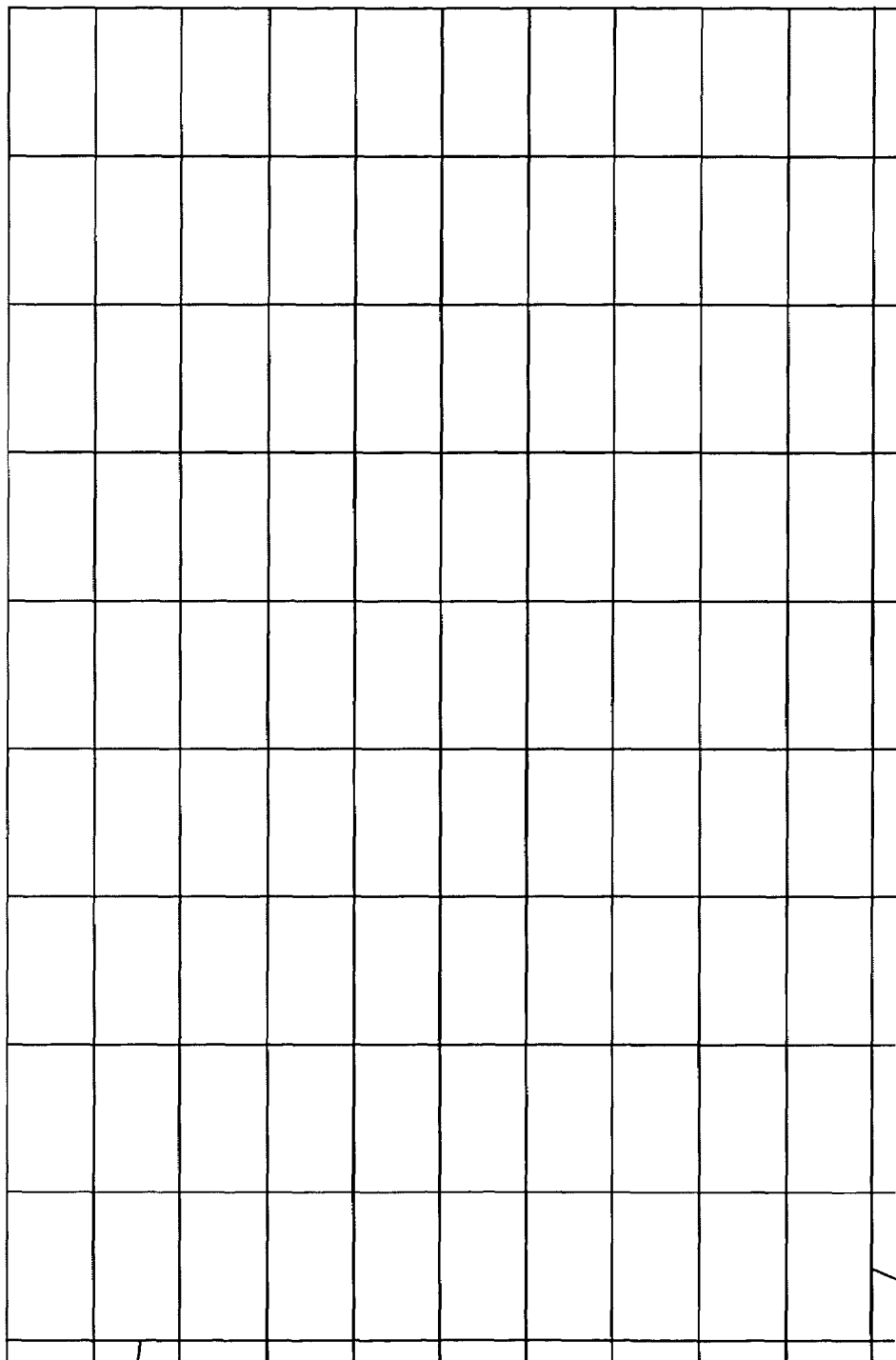
FIG. 9 is a graph illustrating a histogram representing the data types of the samples in FIG. 5 and FIG. 7, according to an embodiment of the present invention.
Figure 10:
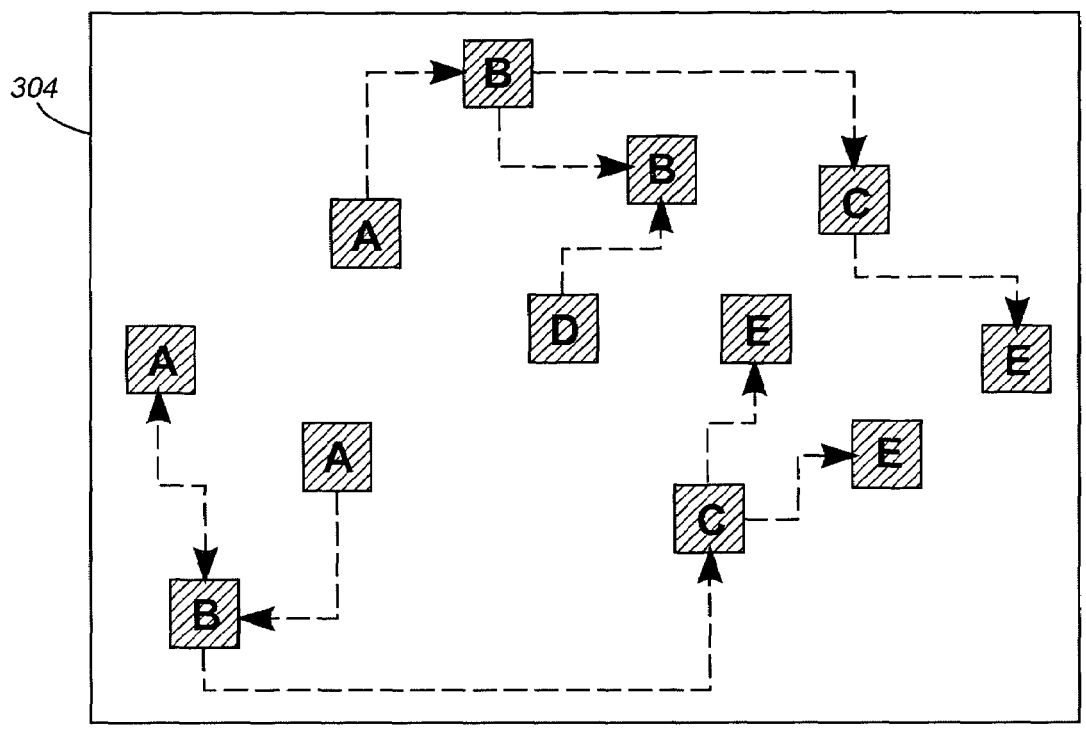
FIG. 10 is a graph illustrating the first sample of FIG. 5 as applied to the histogram of FIG. 9.

FIG. 9 shows a histogram 900 for representing the plurality of categories for the series of samples $S_1$–$S_n$ 302, according to one embodiment of the present invention. The X-axis 902 of the histogram 900, in this example, represents all of the node types in the series of samples $S_1$–$S_n$ 302. For example, in one embodiment, the node types in the first sample $S_1$ 304 through sample $S_n$ 308 are A–H, each having their own tic mark on the X-axis 902 of the histogram 900. The Y-axis 904, in this example, represents the number of instances each node type occurs in each sample. The Y-axis is populated when the histogram 900 is related to each sample in the series $S_1$–$S_n$ 302, thereby creating an instance of the histogram 900 for each sample. The instances of the histogram 900 create a summary of the samples that the environment analyzing tool 110 uses to generate patterns of evolution for the system environment being analyzed. In this embodiment, the histogram 900 is a histogram by data type. However, in another embodiment the histogram 900 is a histogram by edge type. A histogram by edge type represents the node transitions as illustrated by their edges. Other types of histograms should be obvious to those of ordinary skill in the art in view of the present discussion. For example, a histogram combination of all node types and edge types may be used for analyzing a particular system environment. As another example, a histogram may combine a portion of all node types and edge types for analyzing a particular system environment.

Figure 11:
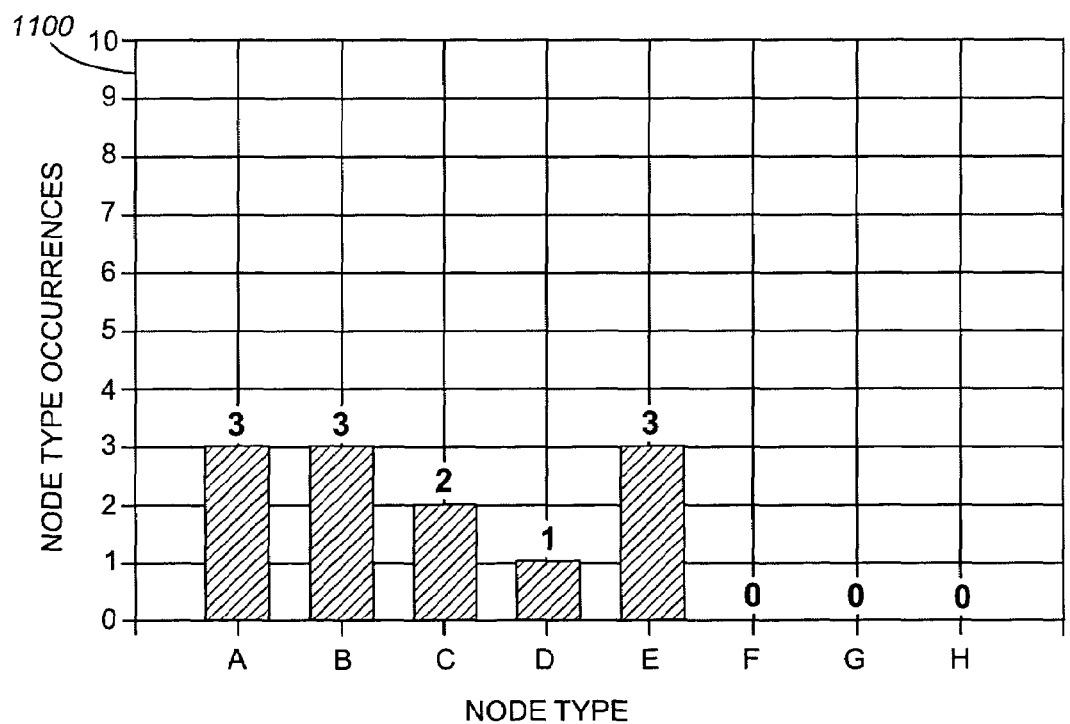
FIG. 11 is a graph illustrating a first instance of the histogram of FIG. 9 as related to the first sample as illustrated in FIG. 10.
Figure 12:
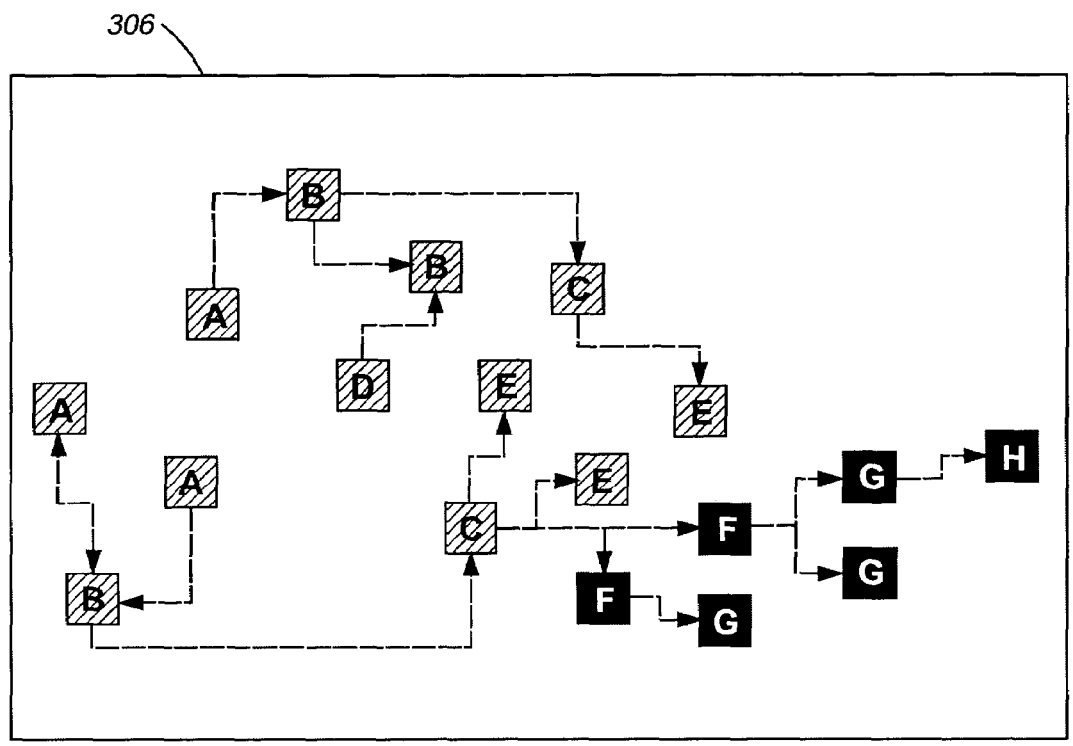
FIG. 12 is a graph illustrating the second sample of FIG. 7 as applied to the histogram of FIG. 9.
Figure 13:
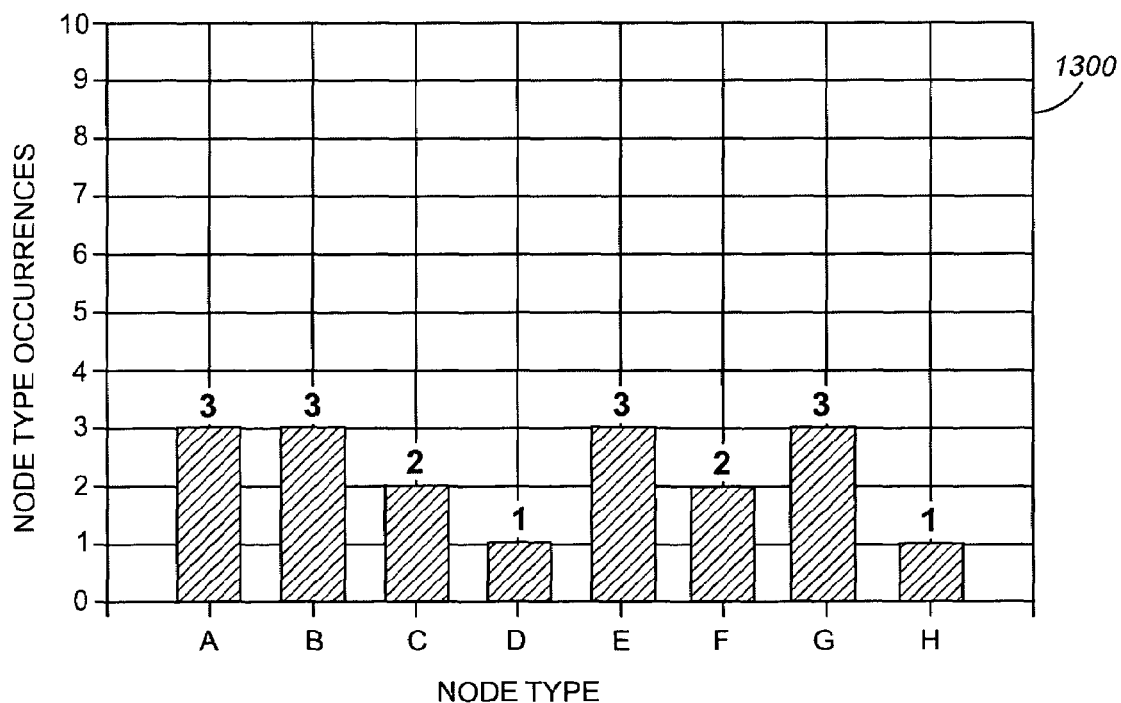
FIG. 13 is a graph illustrating a second instance of the histogram of FIG. 9 as related to the second sample as illustrated in FIG. 12.

For example, FIGS. 10, 12, 14, 16, and 18 show samples $S_1$ 304 to $S_5$ 1800 as related to the histogram 900, which results in instances $H_1$–$H_5$ 1100, 1300, 1500, 1700, 1900 of the histogram 900 as related to the samples $S_1$ 304 to $S_5$ 1800. FIG. 11 shows an instance $H_1$ 1100 of the histogram 900 that represents the number of times that each node type in the series of samples $S_1$–$S_5$ occurs in sample $S_1$ 304. For example, node type A occurs three (3) times and node type F occurs zero (0) times in sample $S_1$ 304. FIG. 13 shows an instance $H_2$ 1300 that represents the number of times that each node type in the series of samples $S_1$–$S_5$ occurs in sample $S_2$ 306. For example, node type A occurs three (3) times and node type F, which has increased by two from $S_1$ 304, occurs two (2) times in sample $S_2$ 306.

Figure 14:
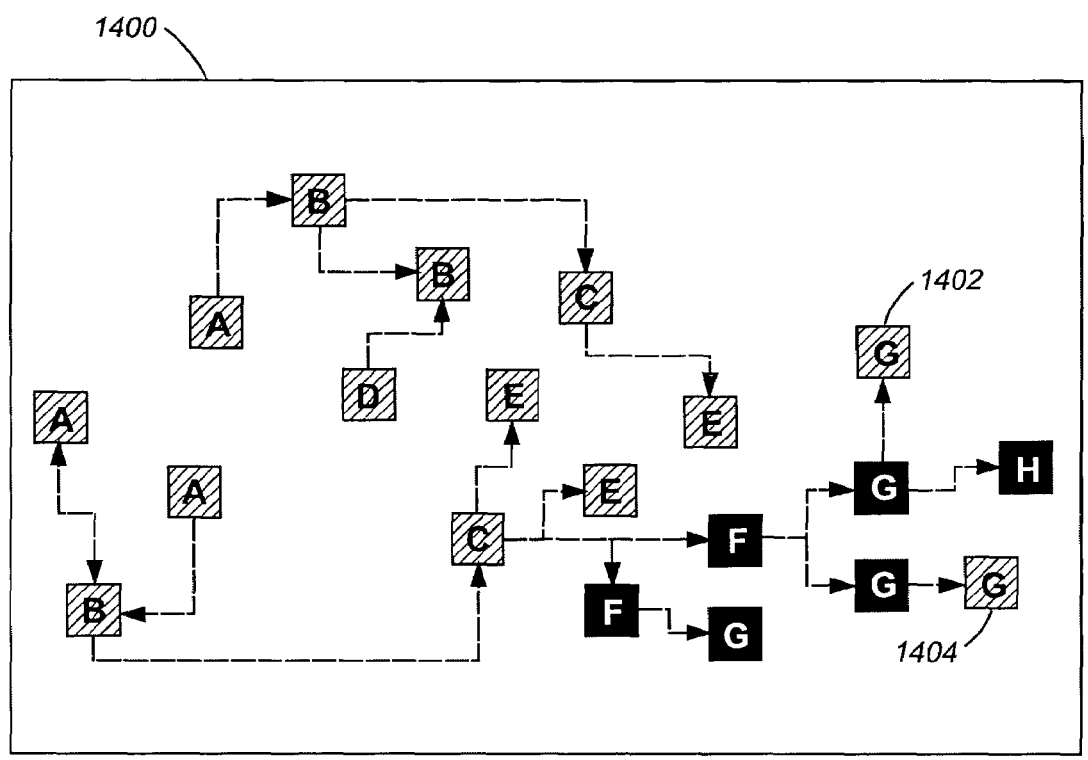
FIG. 14 is a graph illustrating a third sample of the evolving computer system environment as applied to the histogram of FIG. 9.
Figure 15:
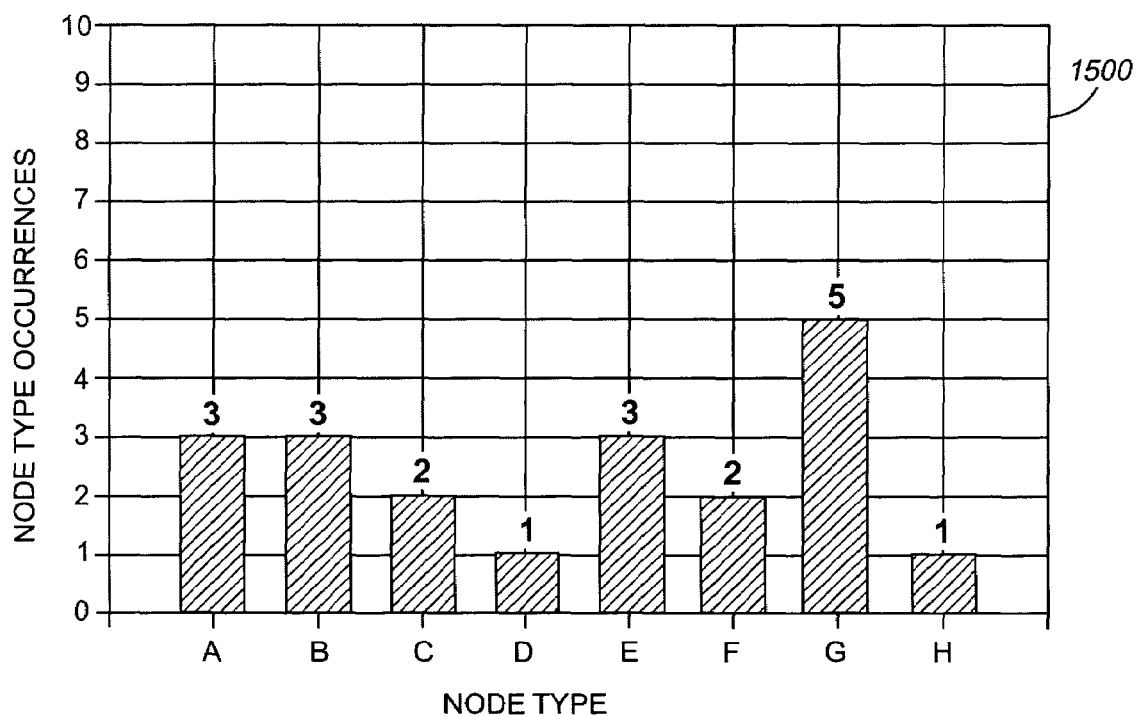
FIG. 15 is a graph illustrating a third instance of the histogram of FIG. 9 as related to the third sample as illustrated in FIG. 14.

FIG. 14 shows a third sample $S_3$ 1400 of the evolving environment of the computer system 100. Sample $S_3$ 1400 shows two added nodes 1402, 1404 of the node type G. FIG. 15 shows an instance $H_3$ 1500 of the histogram 900 as related to the sample $S_3$ 1500. For example, node type A occurs three (3) times, node type F occurs two (2) times, and node type G occurs five (5) times in sample $S_3$ 1500, which increased by two from the second sample $S_2$ 306.

Figure 16:
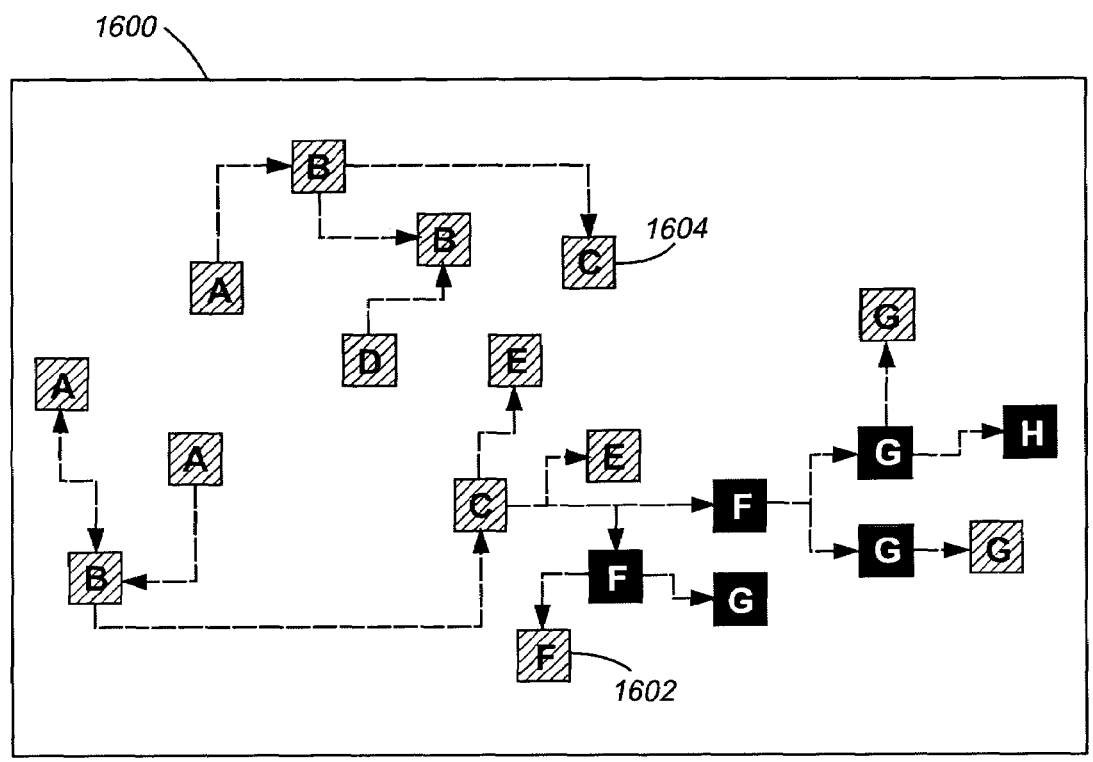
FIG. 16 is a graph illustrating a fourth sample of the evolving computer system environment as applied to the histogram of FIG. 9.
Figure 17:
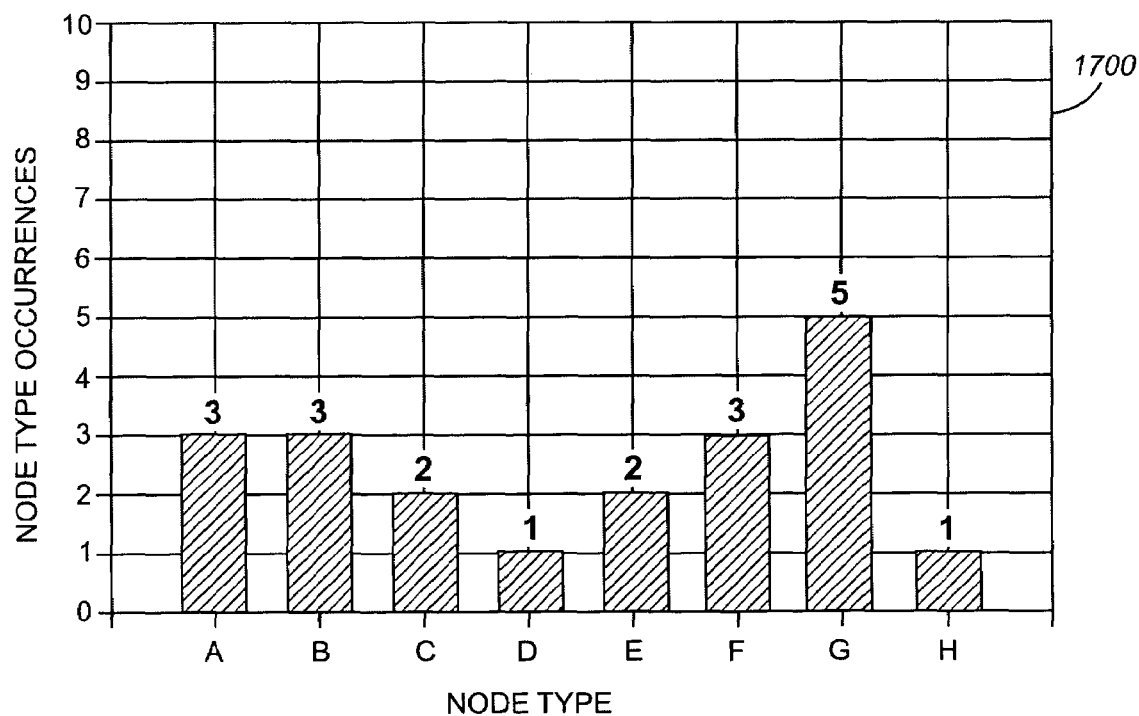
FIG. 17 is a graph illustrating a fourth instance of the histogram of FIG. 9 as related to the fourth sample as illustrated in FIG. 16.

FIG. 16 shows a fourth sample $S_4$ 1600 of the evolving environment of the computer system 100. The fourth sample $S_4$ 1600 shows a node 1602 of the node type F as being added and that a node (not shown) of the node type E has been removed. The removed node was pointed to by a C-type node 1604 in samples $S_1$ to $S_3$ 304, 306, 1400. A node may be removed, for example, when the object represented by the node is no longer in use and was collected by a garbage collector. FIG. 17 shows an instance $H_4$ 1700 of the histogram 900 as related to the sample $S_4$ 1600. For example, node type A occurs three (3) times, node type E occurs two (2) times, which decreased by one from sample $S_3$ 1400, node type F occurs three (3) times, which increased by one from sample $S_3$ 1400, and node type G occurs five (5) times in sample $S_4$ 1600.

Figure 18:
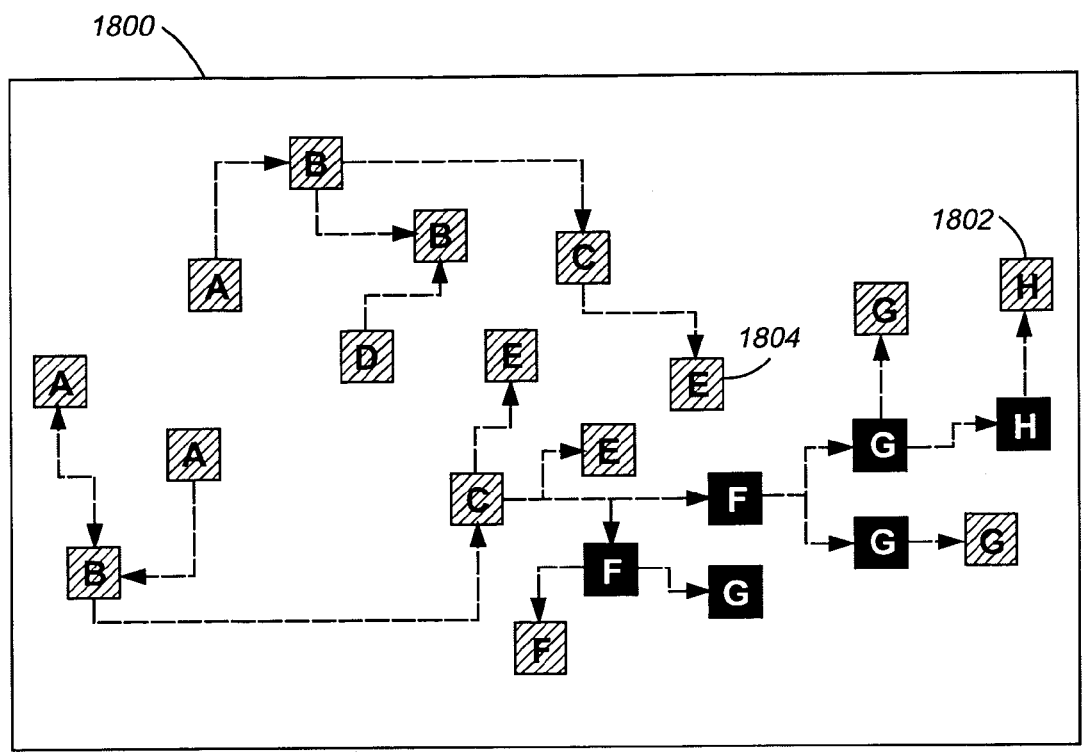
FIG. 18 is a graph illustrating a fifth sample of the evolving computer system environment as applied to the histogram of FIG. 9.
Figure 19:
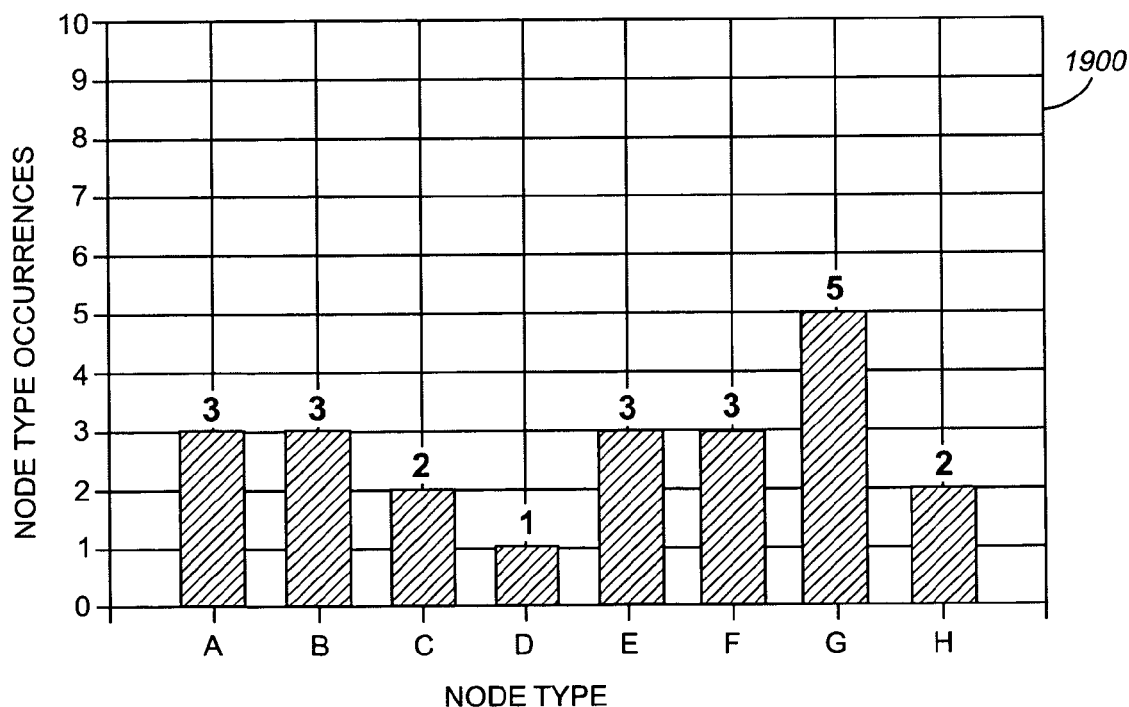
FIG. 19 is a graph illustrating a fifth instance of the histogram of FIG. 9 as related to the fifth sample as illustrated in FIG. 18.

FIG. 18 shows a fifth sample $S_5$ 1800 of the evolving environment of the computer system 100. Sample $S_5$ 1800 shows a node 1802 of the node type H as being added and that a node 1804 of the node type E as also being added. FIG. 19 shows an instance $H_5$ 1900 of the histogram 900 as related to the sample $S_5$ 1800. For example, node type A occurs three (3) times, node type E occurs three (3) times, which increased by one from sample $S_4$ 1600, node type F occurs three (3) times, node type G occurs five (5) times, and node type H occurs two (2) times in sample $S_5$ 1800, which increased by one from sample $S_4$ 1600.

Figure 20:
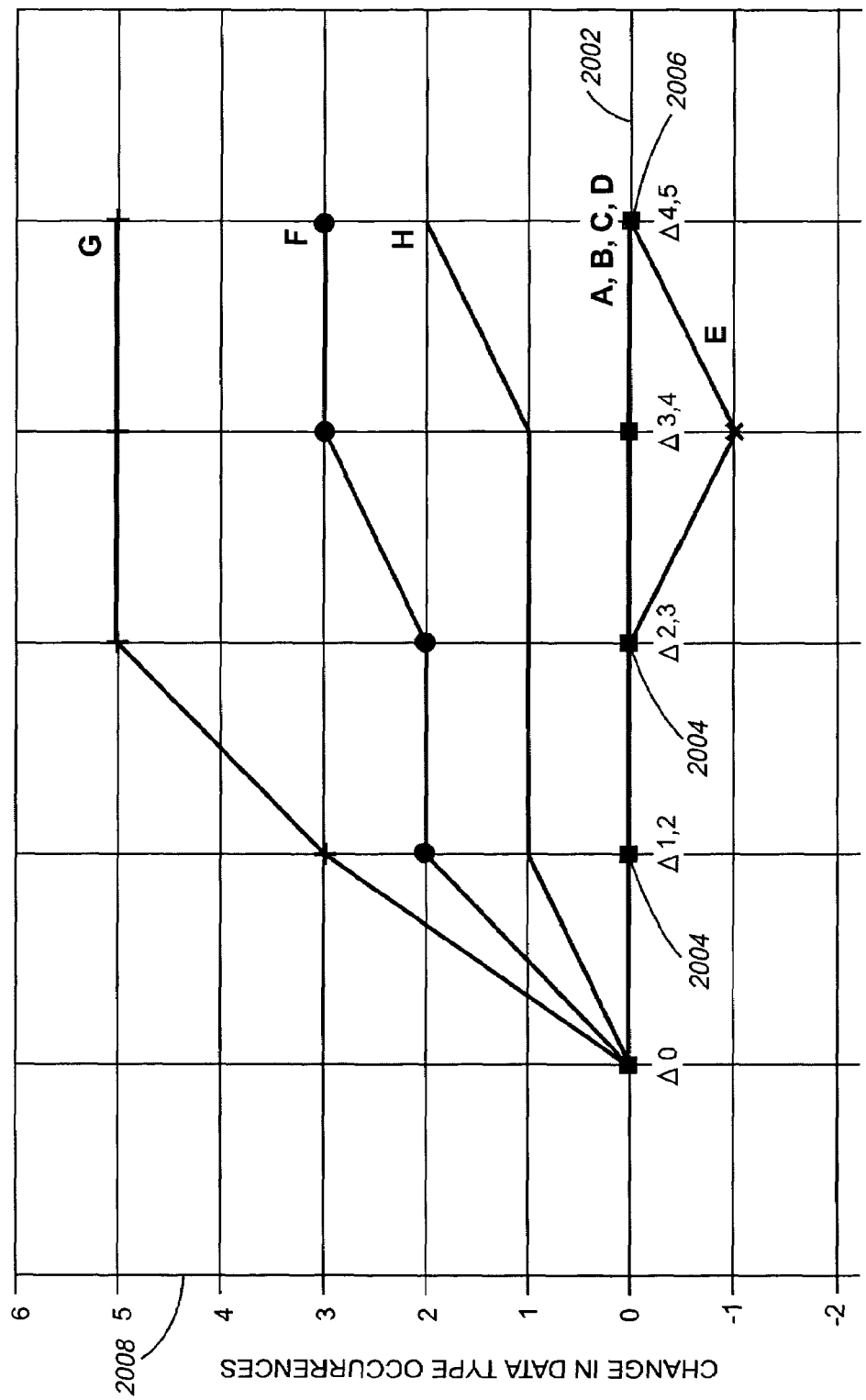
FIG. 20 is a graph illustrating a histogram representing the growth and non-growth of the data types across the samples of FIGS. 10, 12, 14, 16, and 18.

FIG. 20 shows a histogram 2000 summarizing the growth and non-growth of the node types A–H through a period of time represented by the series of samples $S_1$ 304 to $S_5$ 1800. The X-axis 2002 of the histogram 2000 includes tic marks ($\Delta 0$), ($\Delta 1$, 2), ($\Delta 2$, 3), ($\Delta 3$, 4), ($\Delta 4$, 5) for a comparison sequence of the instances $H_1$ 1100 to $H_5$ 1900 of the histogram 900. For example, tic mark 2004 represents the comparison of instance $H_1$ 1100 to instance $H_2$ 1300 and tic mark 2006 represents the comparison of instance $H_4$ 1700 to instance $H_5$ 1900. The Y-axis 2008 represents the change in node type occurrences across each instance $H_1$ 1100 to $H_5$ 1900. For example, the number of occurrences in the node types A–D remained constant across the instances $H_1$ 1100 to $H_5$ 1900. Therefore, in one embodiment, the environment analyzing tool 110 considers these node types as non-growers. However, node type G increased by three from instance $H_1$ 1100 to instance $H_2$ 1300. Node type G then increased again by two from instance $H_2$ 1300 to instance $H_3$ 1500. Therefore, the environment analyzing tool 110, in one embodiment, considers these node types as maybe-growers/possible growers. Non-growers or definitely-not-growers are node types that remain constant in the number of instances throughout the series of sample. Maybe-growers are node types that change in the number of instances through the series of samples. Definite growers are node types that increase in the number of instances in every sample.

The comparison histogram 2000 creates a general summary of how regions in the samples $S_1$ 304 to $S_5$ 1800 are evolving and therefore, how the environment being analyzed is evolving. The instances $H_1$ 1100 to $H_5$ 1900 of the histogram 900 and the comparison histogram 2000 help generate a pattern of a region or regions' evolution trend. For example, if a region only has nodes added to it, this region is labeled as a monotonic grower. If a roughly equal mixture of added nodes and removed nodes has occurred, this region is labeled as an oscillator. If nodes have only been removed, this region is labeled as a shrinker and if nothing has occurred, this region is labeled a flatliner.

To help identify co-evolving regions, owner proxy and change proxy waypoints are identified within the samples.

Figure 21:
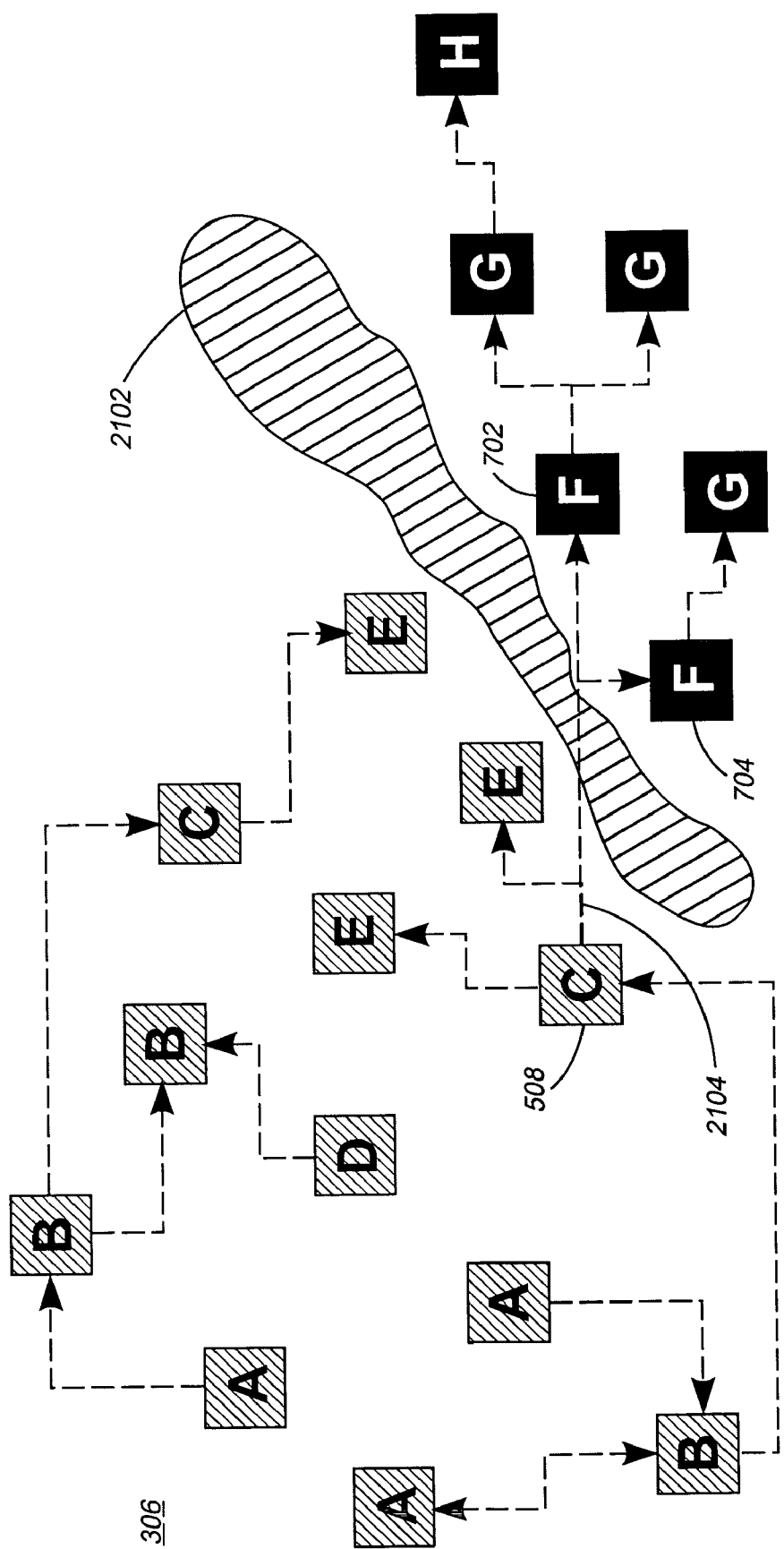
FIG. 21 is a graph illustrating a fringe boundary in the second sample of FIG. 7.
Figure 22:
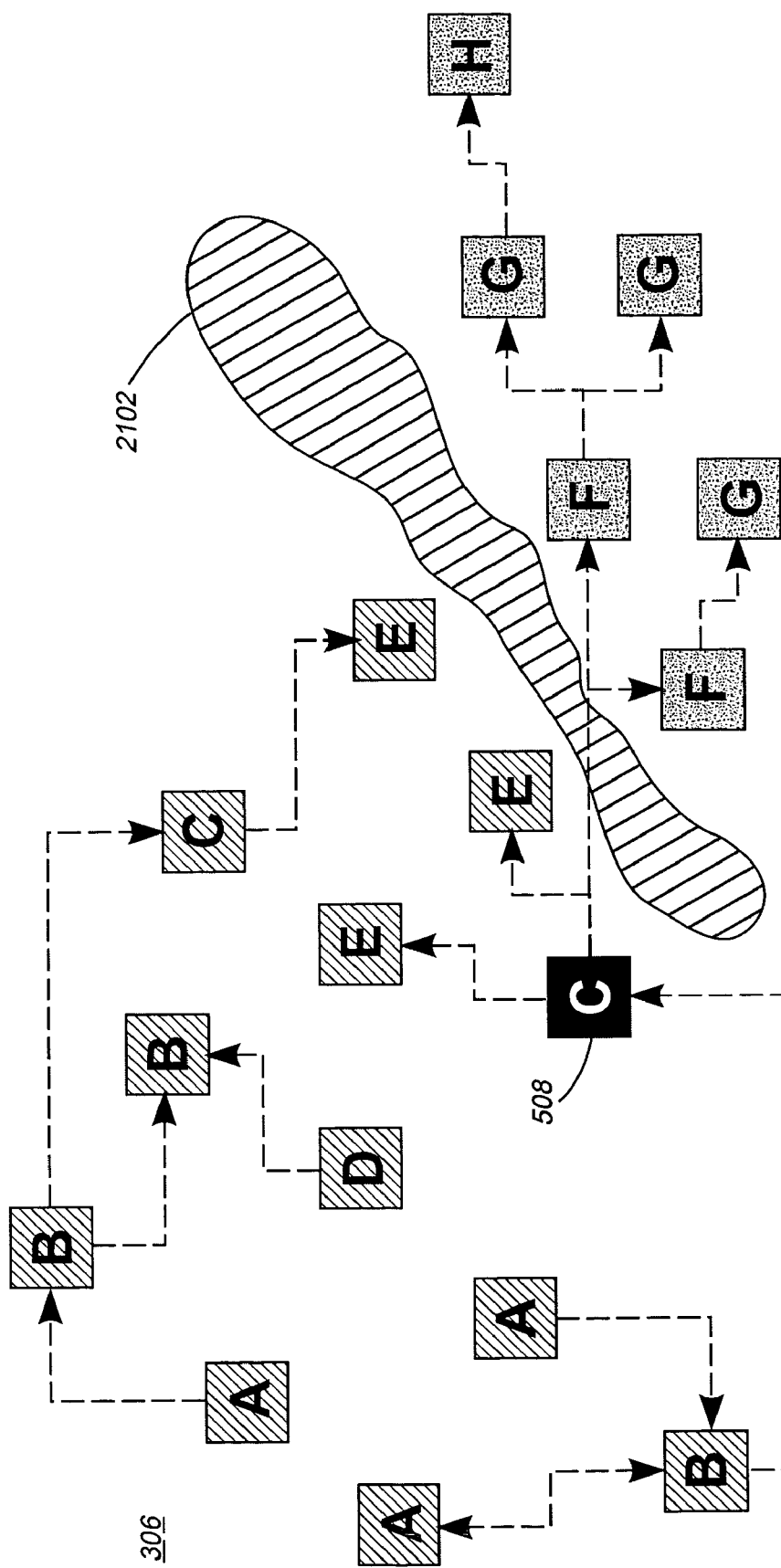
FIG. 22 is a graph illustrating an owner-proxy in the second sample of FIG. 7.
Figure 23:
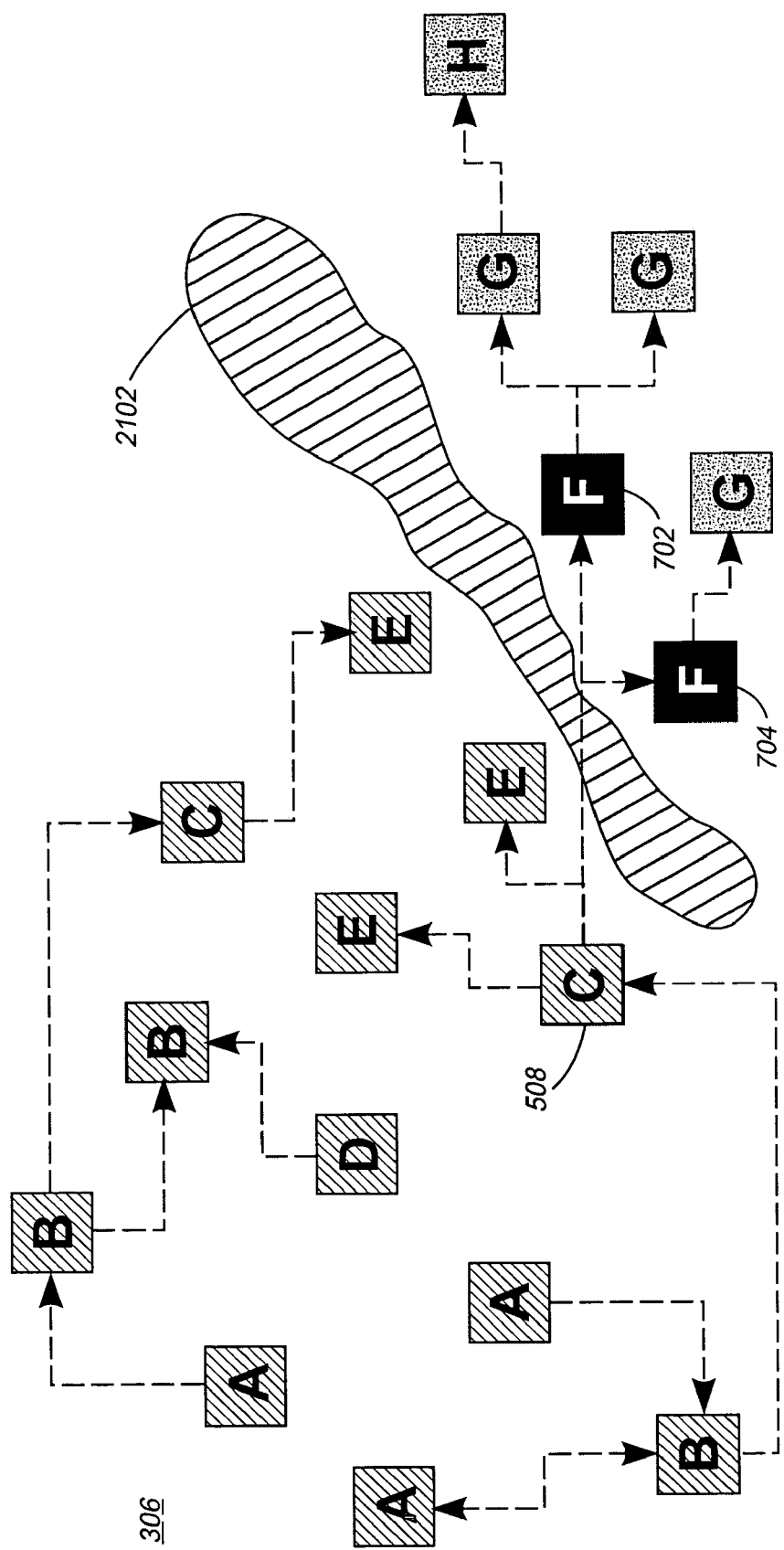
FIG. 23 is a graph illustrating change proxies in the second sample of FIG. 7.

For example, in FIG. 21, a fringe boundary 2102 represents the boundary of change in a region and is located by identifying an owner-proxy and a change proxy. The fringe boundary 2102 exists between older and recently created nodes. For example, the older node 508 points to a new node 702, 704. FIG. 22 shows the owner-proxy for the second sample $S_2$ 306 in FIG. 21. The older node 508 is identified as the owner-proxy because this is the first non-changing node that dominates the new nodes represented by the grey boxes. In other words, the older node 508 is a stable node on the old side of and in close proximity to the fringe and therefore, helps identify the fringe 2102 and regions of possible evolution. FIG. 23 shows the change proxies 702, 704 for the sample $S_2$ 306 in FIG. 21. Nodes 702, 704 are change proxies (indicators of updates to the region) for the larger-scale evolution because they dominate the four other new nodes.

Figure 24:
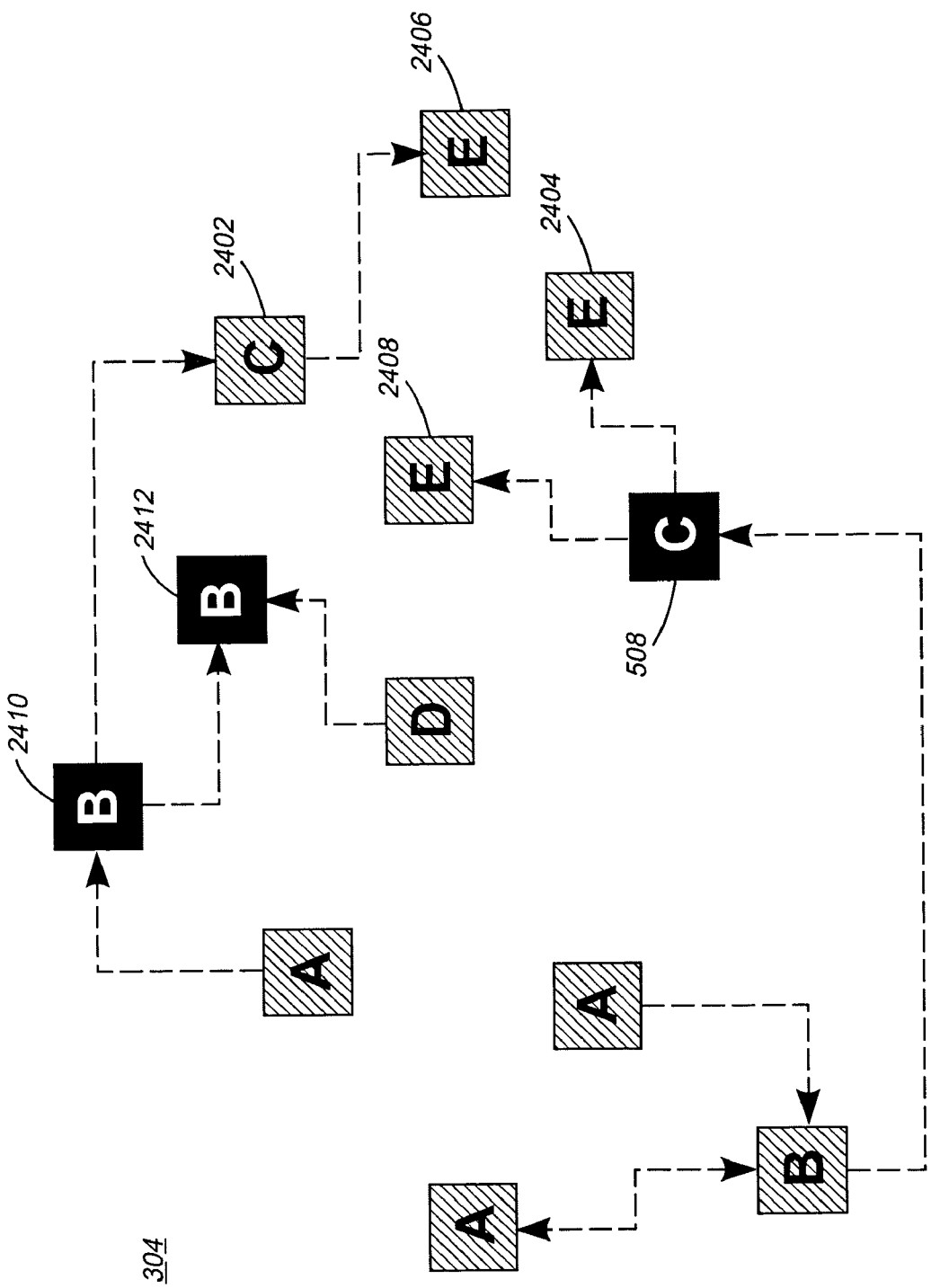
FIG. 24 is a graph illustrating various backbone types in the first sample of FIG. 5.

FIG. 24 shows the first sample $S_1$ 304 wherein different backbone types have been identified. Distinguishing backbone types, for example, array backbones from non-array backbones is useful because backbones are an important way in which graphs change. Nodes are usually added and removed along backbones. In FIG. 24, nodes of the node type C 508, 2402 are array backbones because each node points to elements of uniform type. Each node of the node type C 2402, 508 point to a node of the node type E 2404, 2406, 2408. The node of the type B 2410 is a non-array backbone because it points to an element of its same type. For example, each node of the node type B 2410 point to a node also of the node type B 2412.

Figure 25:
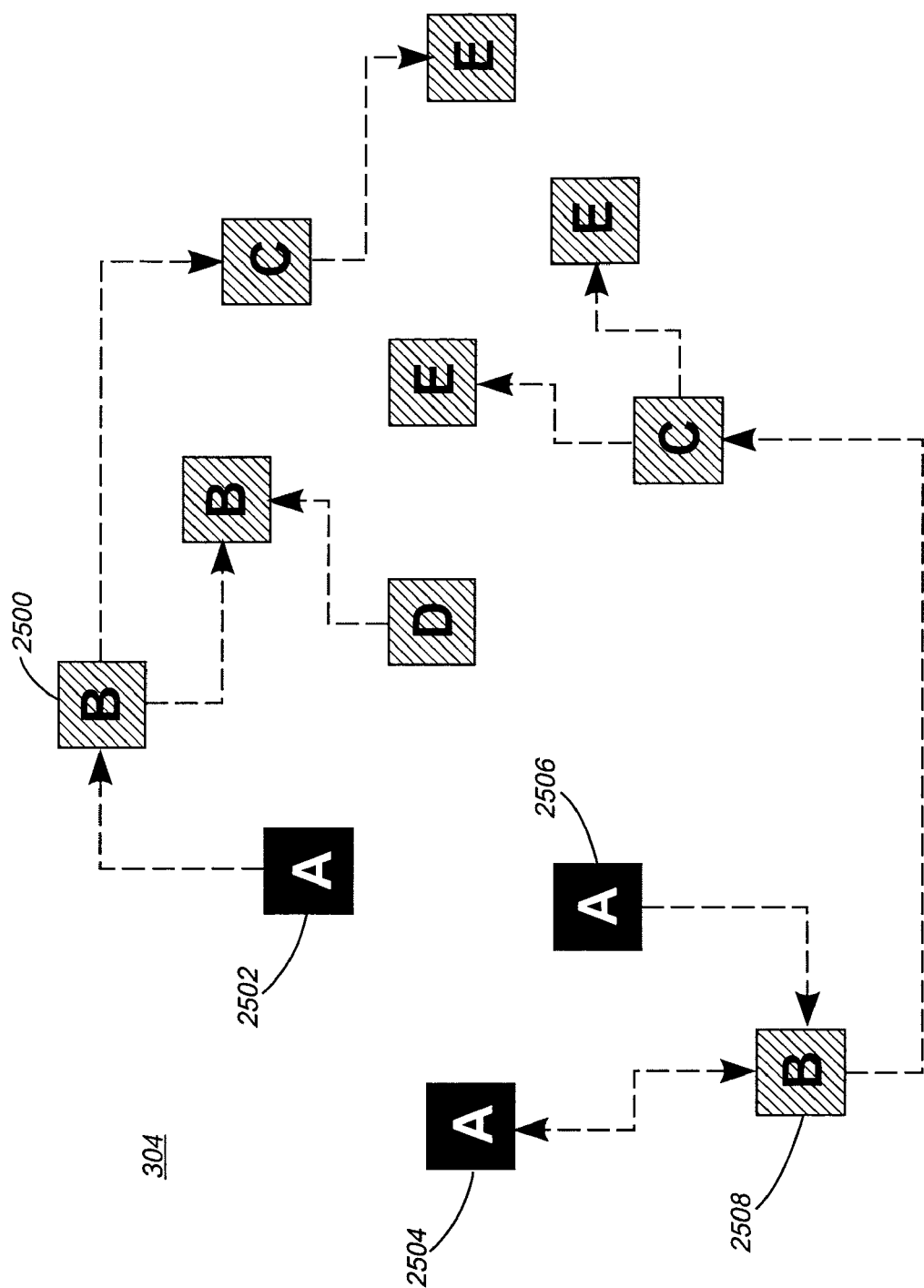
FIG. 25 is a graph illustrating correlated node types in the first sample of FIG. 5.

Identifying backbone structures is beneficial when accounting for changes in the graph. For example, if a node is of the node type List and the sample/graph is changing by the addition of elements to this node/List. The change proxy type will be that of a list entry and each element of that list, for example, a list entry should begin with an entry of the same type. However, the context of each entry might be different. For example, the context of the second entry includes the first entry and the context of the third entry includes the first and second. If the node/List's entry type has been recognized as a non-array backbone, this kind of linear backbone structure can be accounted for and a further understanding of the sample/graph's evolution can be obtained FIG. 25 shows the first sample $S_1$ 304 with correlated node types identified within. FIG. 25 shows a first node 2502, a second node 2504, and a third node 2506 all of the node type A each pointing to a node 2508, 2510 of the node type B. Therefore, node types A and B are correlated because every instance of A points to exactly one instance of B. Identifying correlated data types in a graph is beneficial when analyzing the evolution of the graph. For example, if two node types are "correlated" that means nodes of one type will evolve in tandem with nodes of the other type. This is very helpful in analyzing evolution. For example, when the evolution characteristics of a first node type is not known, but is known for a second node type, knowing that those two node types are "correlated" allows an inference as to how the first type is evolving. Additionally, knowing if node types are correlated is also advantageous when a graph is evolving in two ways, where the second region of evolution is nested inside the first, for example, when a Java program has a List data structure that contains other List data structures. In this situation, the "List" type will be a definite grower, not because of the outer List, but because of the inner Lists. This leads to the possibility of falsely concluding that the outer list is also part of some evolution when it is not. However, if it is known that the parent of the outer List is correlated with the outer list, false conclusions of evolution can be avoided.

Another situation where knowing if node types are correlated is useful is when you have a node type that in one context is not growing and is growing in another context. For example, if every time a node with the node type F is added, a node with the node type E is also added. However, the node type E also remains constant or does not grow in another context. Knowing whether F and E are correlated helps distinguish whether node type E is actually growing and is a reason for concern.

Figure 26:
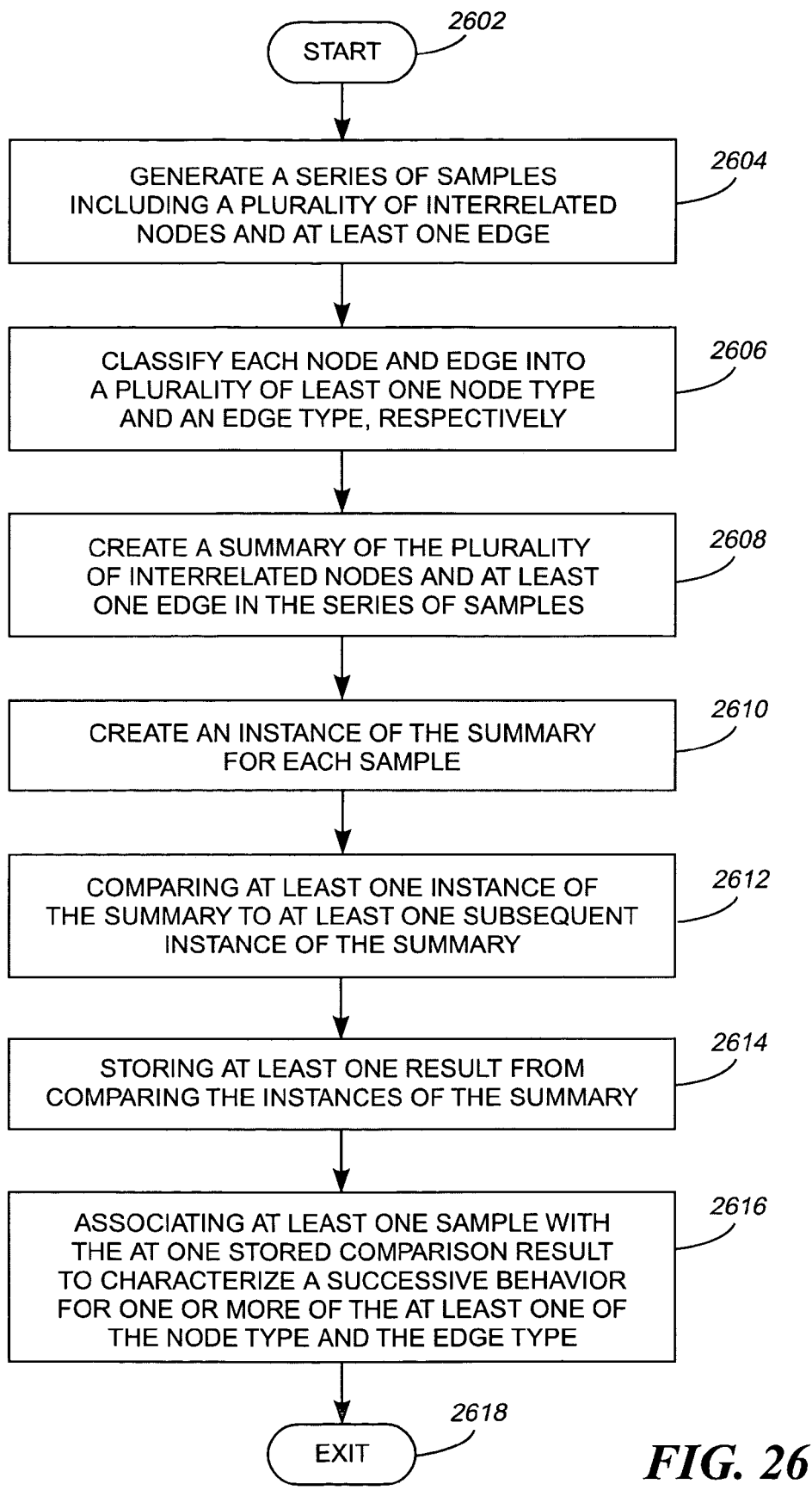
FIG. 26 is an operational flow diagram illustrating the process of determining how regions in a graph of an environment are evolving.

FIG. 26 is an operational flow diagram showing an exemplary process of identifying evolving regions in an environment of the computer system 100. The operation flow diagram of FIG. 26 begins with step 2602 and flows directly to step 2604. A series of samples of an evolving computer system environment is generated. For example, the sample generator 202 takes a series of successive samples/snapshots $S_1$ 304 to $S_5$ 1800 of the environment to be analyzed. The number of samples generated is not limited to the example given. A computer system environment, for example, is a memory usage in an executing program, a computational resource in an executing program, a computational resource in a computer network, or the like. A user would want to have a sample generated, for example, when a program crashes due to insufficient memory and start the analyzing process to find a memory leak. In one embodiment, the samples $S_1$ 304 to $S_5$ 1800 are in the form of a reference graph. Each sample includes a plurality of interrelated nodes representing objects in the environment and at least one edge. For example, in one embodiment, a sample includes nodes representing data structures in a Java program. The reference relationships of the nodes are shown by the edges of the nodes. Each sample, for example, is stored in the data memory 106 and in one embodiment is stored in the optional repository 114 in the data memory 106. The samples in another embodiment are stored in a register, cache, hard drive, or the like. Each node and edge in the series of samples $S_1$ 304 to $S_5$ 1800, at step 2606, is classified into a plurality of at least one node type and an edge type, respectively. A node type, for example, is a type of data structure or a type of function represented by a letter, color, number, or the like.

A summary or histogram 900 that summarizes the samples, at step 2608, is created by the summarizer 206 and represents the plurality of node types and/or a plurality of edge types for the series of samples $S_1$ 304 to $S_5$ 1800. A series of instances $H_1$ 1100 to $H_5$ 1900 of the histogram 900, at step 2610, is created for the series of samples $S_1$ 304 to $S_5$ 1800. Each sample in the series of samples $S_1$ 304 to $S_5$ 1800 has a corresponding instance of the histogram 900, which summarizes the sample. At least one instance is stored in the data memory 106 and in one embodiment is stored in the optional repository 114 in the data memory 106. In another embodiment, the instance(s) are stored in a register, cache, hard drive, or the like. At least one instance of the histogram 900, at step 2612, is compared by the comparator 208 with a subsequent instance of the histogram 900. A subsequent instance is an instance created later in time. The comparator 208 is comparing summaries of the samples/graphs represented by the instances of the histogram 900. Also, in one embodiment, a plurality of the instances, for example three or more, are compared to each other. At least one result of this comparison, at step 2614, is stored in the data memory 106 and in one embodiment are stored in the optional repository 114 in the data memory 106.

At least one sample of the evolving environment of the computer system 100, at step 2616, is associated with the at least one stored comparison result 322 to characterize a successive behavior of at least one of the node types and/or at least one of the edge types. For example, the at least one stored comparison result 322 are combined with a new sample of the environment or in another embodiment, a sample for the already generated series of samples $S_1$–$S_n$ 302. In one embodiment, the environment analyzing tool identifies a change proxy 702, 704 (FIG. 23) and an owner proxy 508 (FIG. 22) in the sample combined with the at least one stored comparison result 322 and a fringe boundary 2102 is located. The fringe boundary 2102 identifies regions in the sample combined with the at least one stored comparison result 322 that are evolving or non-evolving. The behavior of at least one of the node types and/or edge types is then able to be characterized as either non-growers or maybe-growers. The nodes can also be identified as a definite grower. The control flow then exits at step 2620

Figure 27:
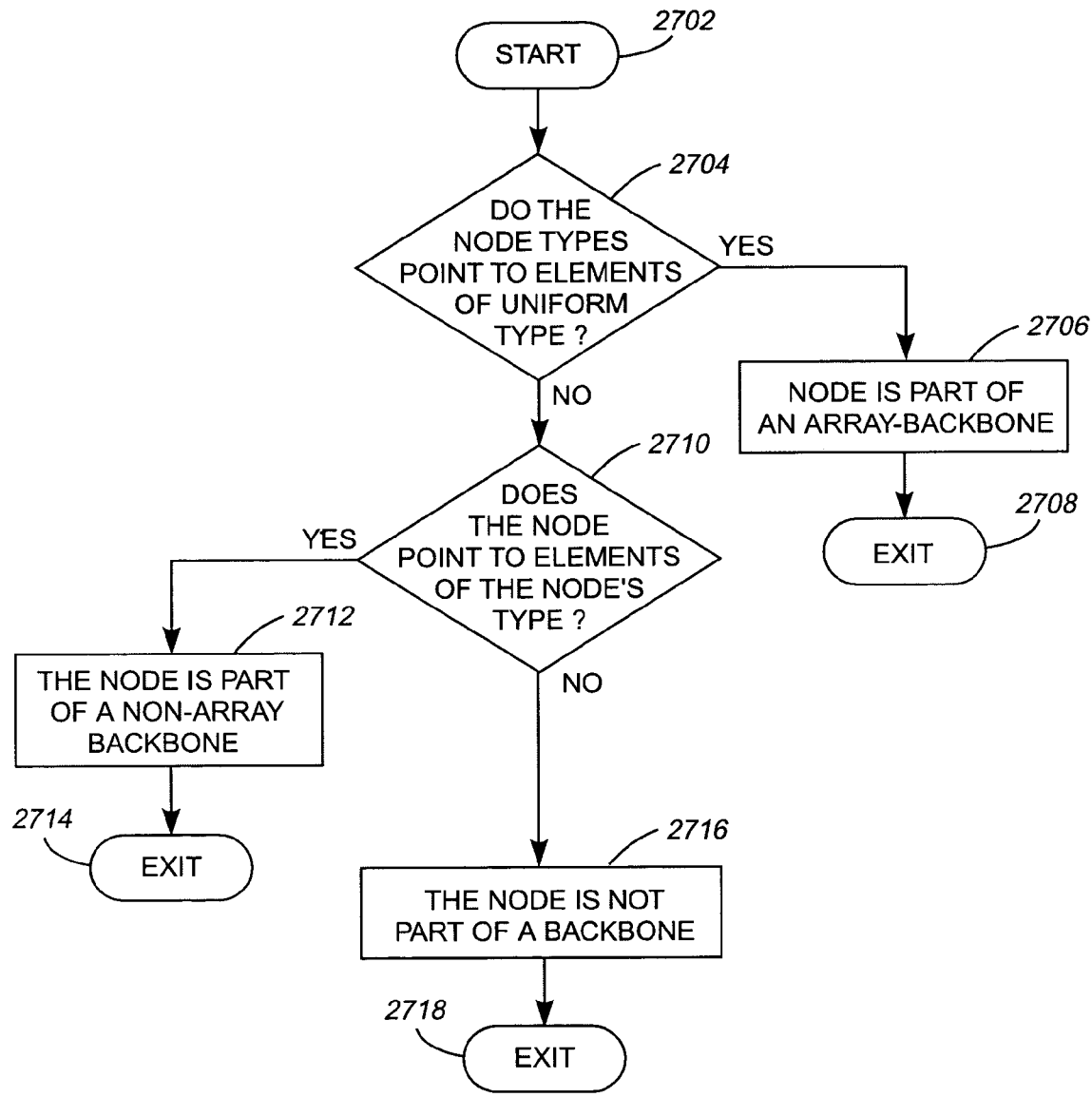
FIG. 27 is an operational flow diagram illustrating the process of determining the backbone type of node types.

FIG. 27 is an operational flow diagram showing an exemplary process identifying backbone types within a graph. The operation flow diagram of FIG. 27 begins with step 2702 and flows directly to step 2704. The environment analyzing tool 110, at step 2704, determines whether the node types of a particular graph point to elements of a uniform type. If the result of this determination is positive, the node is determined, at step 2706, to be part of an array backbone. For example, as discussed above with respect to FIG. 24, the nodes of the type C point to nodes of the type E. The control flow then exits at step 2708. If the result of this determination is negative, the environment analysis tool 110, at step 2710, determines whether the node points to elements that are of the same type as the node. If the result of this determination is positive, the node is determined, at step 2712, to be part of a non-array backbone. For example, as discussed above with respect to FIG. 24, the node 2410 of the type B point to node 2412 of the type B. The control flow then exits at step 2714. If the result of this determination is negative, the node is determined, at step 2716, to not be part of a backbone. The control flow then exits at step 2718. As discussed above, identifying whether a node is part of a backbone is advantageous because it enhances the evolution analysis process.

Figure 28:
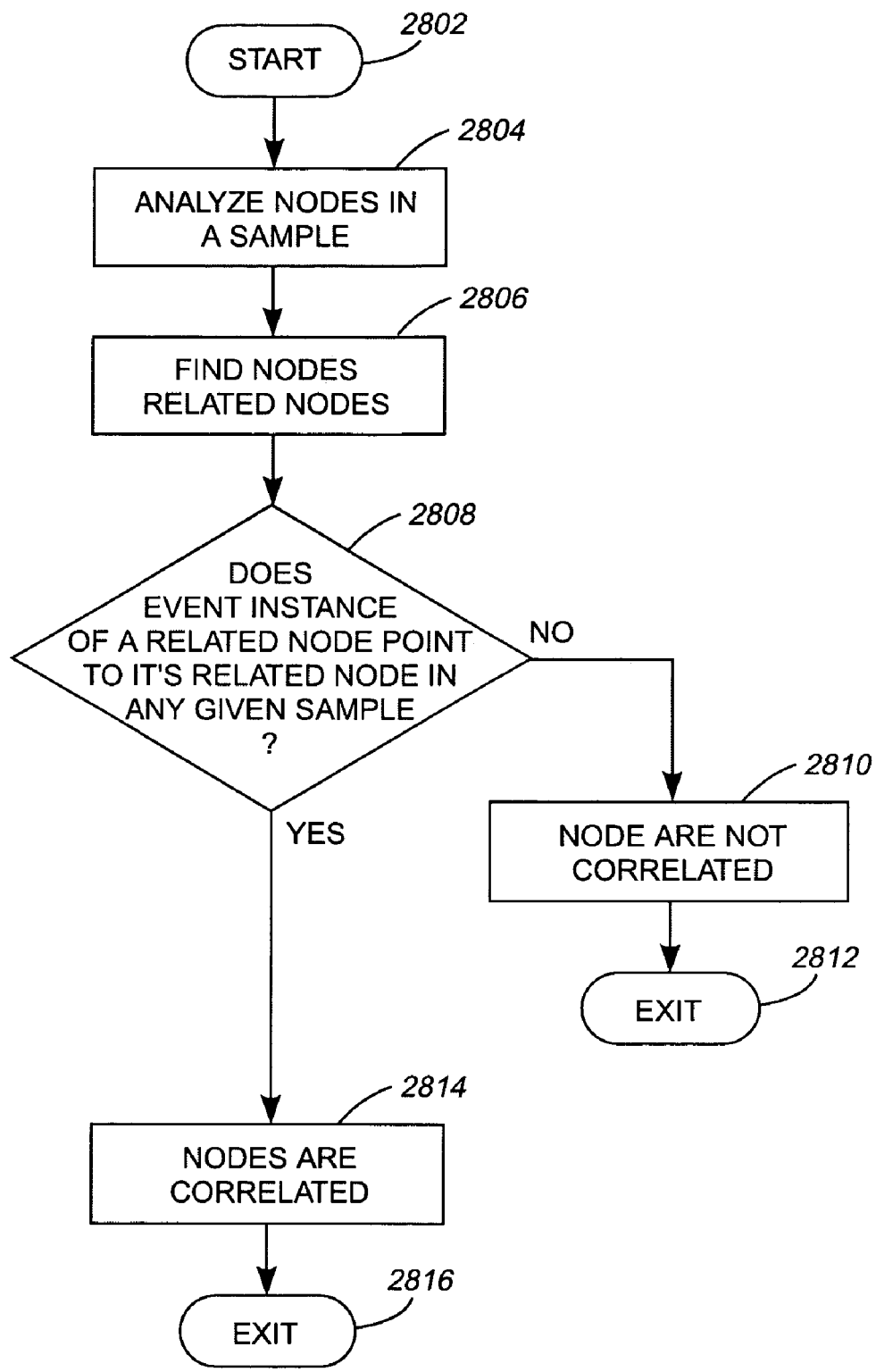
FIG. 28 is an operational flow diagram illustrating the optional process of identifying correlated node types.

FIG. 28 is an operational flow diagram showing an optional process of identifying correlated node types in a graph, according to an embodiment of the present invention. The operation flow diagram of FIG. 28 begins with step 2802 and flows directly to step 2804. The environment analyzing tool 100, at step 2804, analyzes the nodes in a sample. The environment analyzing tool 110, at step 2808, finds nodes related to each other. For example, the environment analyzing tool 110 looks at the reference relationships represented by the edges in the graphs to determine if a node is related to another node. The environment analysis tool 110, at step 2808, determines whether every instance of a first elated node point to a second related node in any given sample. If the result of this determination is positive, the nodes, at step 2814, are identified as being correlated. For example, as discussed above with respect to FIG. 25, each instance of the node type A 2502, 2504, 2506 points to an instance of the node type B 2508. Therefore, node type A would be identified as being correlated with node type B. The control flow then exits at step 2816. If the result of the determination is negative, the nodes, at step 2810, are identified as not being correlated. Then control flow then exits at step 2812.

Identifying correlated node types is optional, but advantageous when analyzing the evolution of an environment. For example, as stated above, if two node types are "correlated" that means nodes of one type will evolve in tandem with nodes of the other type. This is very helpful in analyzing evolution. For example, when the evolution characteristics of a first node type is not known, but is known for a second node type, knowing that those two node types are "correlated" allows an inference as to how the first type is evolving.

Figure 29:
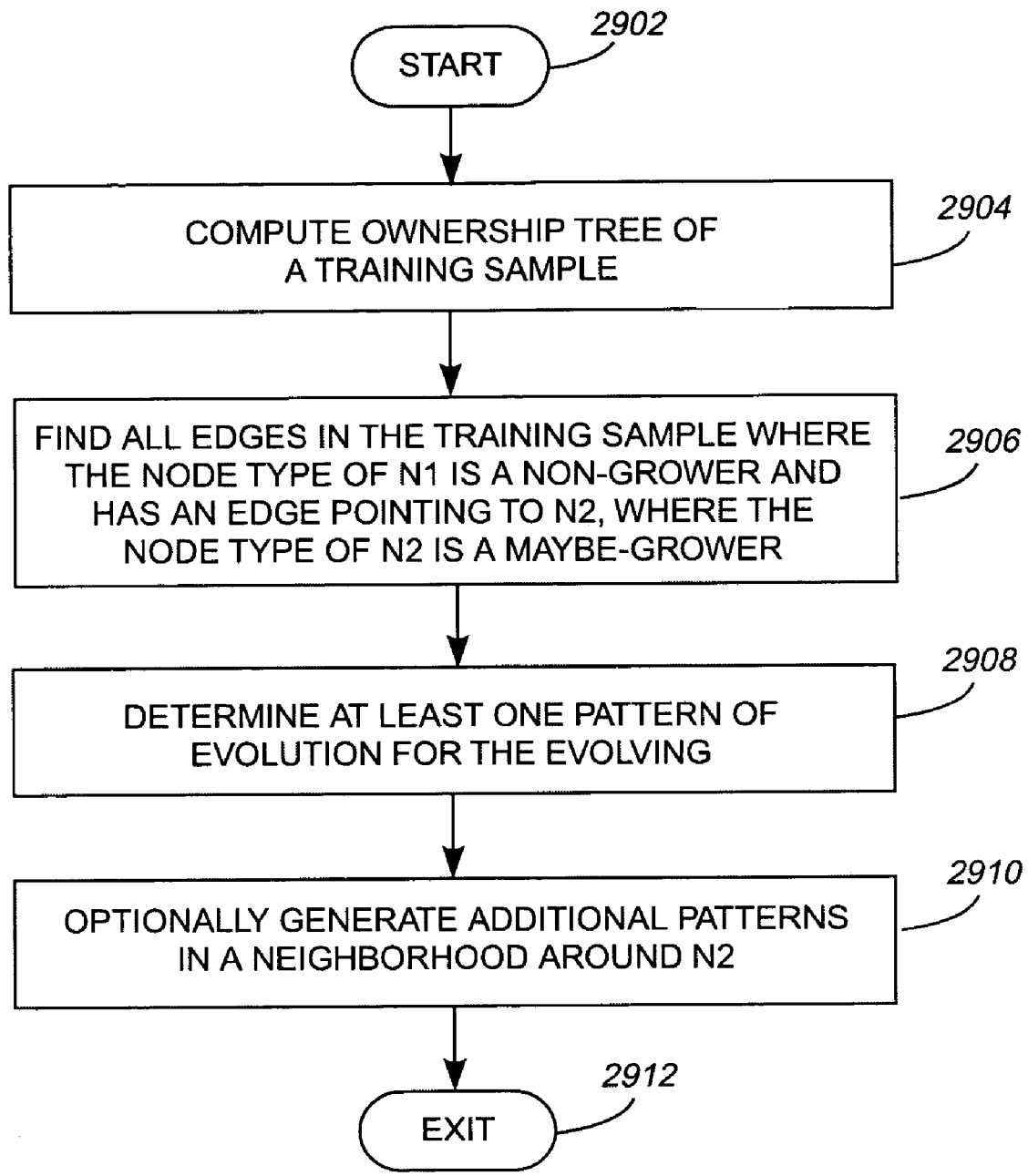
FIG. 29 is an operational flow diagram illustrating the process of generating patterns of evolution for regions in a graph of an environment.

FIG. 29 is an operational flow diagram showing the process of generating patterns that estimate the evolution of regions in a graph. The operation flow diagram of FIG. 29 begins with step 2902 and flows directly to step 2904. The sample generator 202, at step 2904, generates a training sample and the ownership tree of the training sample is computed. The training sample, in one embodiment, is one of the samples in the series $S_1$–$S_n$ 302, which is a graph representing a snapshot of an environment to be analyzed. All edges in the training sample, at step 2906, are found where the node type of n1 is a non-grower and has an edge pointing to n2, where the node type of n2 is a maybe-grower. For example, in FIG. 21 node 508 is a non-grower according to the comparison histogram 2000 of FIG. 20 and has an edge 2104 pointing to node 702. Node 702 is of the node type F and according to the comparison histogram 2000, is a maybe-grower. Therefore, if sample $S_2$ 306 was the training sample, the environment analyzing tool 110 would identify the edge from node 508 to node 702 as defining the boundary of some region that is evolving. The pattern generator 210, at step 2908, generates/determines at least one pattern of evolution for the evolving region based on the successive behavior characterized for the one or more of the at least one of the node type and the edge type. The generated/determined pattern, for example, estimates how at least one region in the evolving computer system environment comprising the plurality of interrelated nodes is evolving. In an alternative embodiment, a pattern of evolution is generated/determined by a border, in the series of samples, between nodes of a first category that are non-evolving and nodes of a second category that are at least one of possibly evolving and evolving.

A pattern, for example, is a tuple (C, T), where C is a context in the graph's ownership tree. In one embodiment where only the ownership tree is analyzed, a context C of a node is the path from that node, upwards along the chain of parent edges, to the root of the tree. In a tree, every node has at most one parent. In another embodiment where the full graph (and not the ownership tree) is considered, then the context C of a node is also the set of nodes that reach that node. T is the change proxy type (the unit of evolution). When considering ownership trees, the root R of a context is the node in the chain of parents, and the owner proxy is the last node in that chain. For every boundary between non-grower (n1) and maybe-grower (n2), the pattern generator 210 generates a pattern for the region (I,typeof(n2)) where I is the context of n1 in the ownership tree, typeof is the node type of n2, the maybe-grower. The pattern generator 210, at step 2910, optionally generates additional patterns in a neighborhood around n2. These additional patterns often capture domain-specific peculiarities of how graphs evolve. For example, in Java, instances of arrays cannot grow, so a program must periodically reallocate a larger array; as this happens sporadically, hence, between any two samples, the evolution may not be witnessed. The control flow then exits at step 2912.

Figure 30:
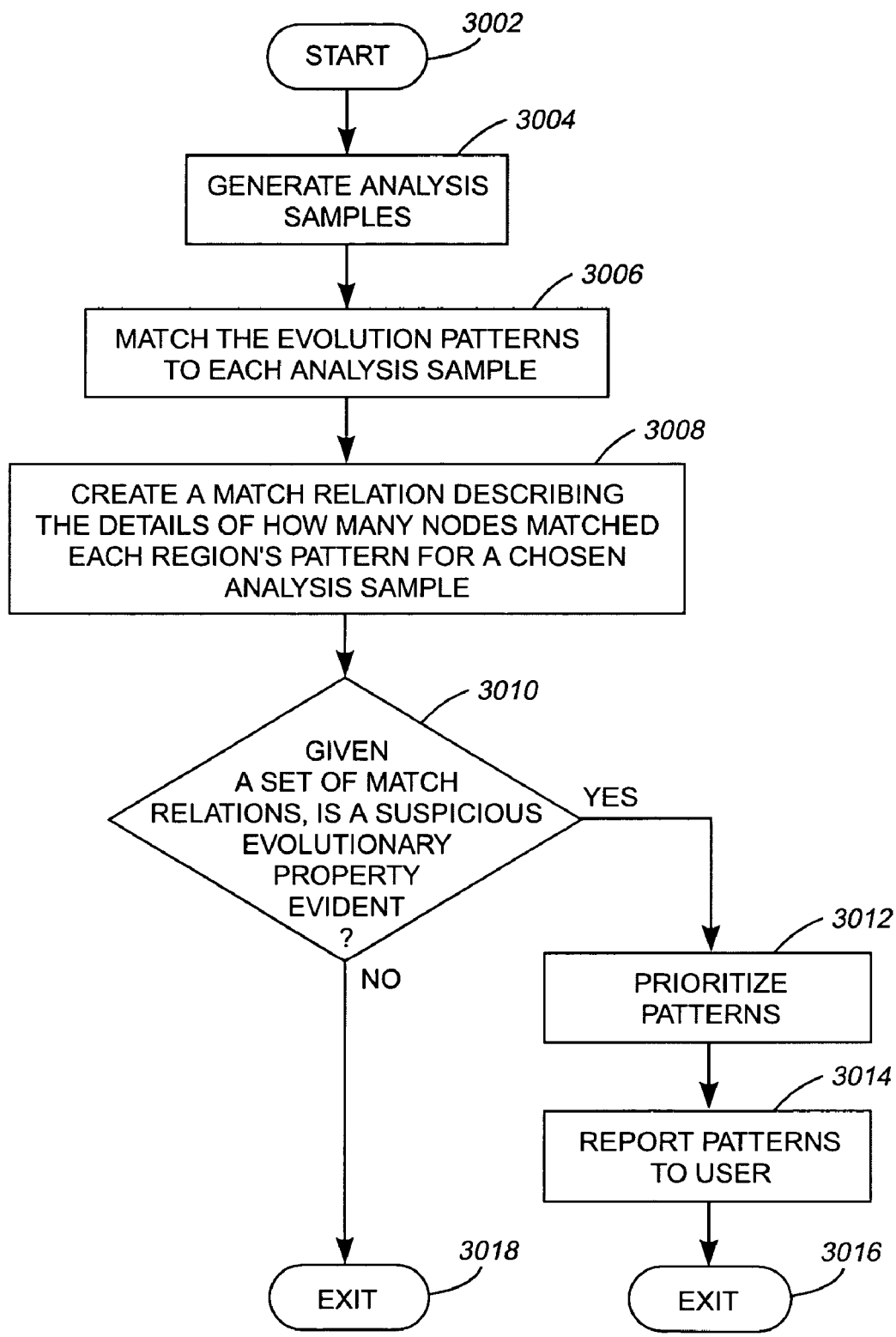
FIG. 30 is an operational flow diagram illustrating the process of validating and reporting the generated patterns of FIG. 29.

FIG. 30 is an operational flow diagram showing a process of validating and reporting the patterns to a user. The operation flow diagram of FIG. 30 begins with step 3002 and flows directly to step 3004. The sample generator 202, at step 3004 generates additional samples (analysis samples) of the environment being analyzed. In one embodiment, the analysis samples are at least two of the samples from the series $S_1$–$S_n$ 302 and can include the training sample. In another embodiment, the analysis samples are new samples taken of the environment. The more analysis samples used to match the generated pattern, the higher the confidence of the analysis will be.

The environment analyzing tool 110, at step 3006, matches the evolution patterns to each analysis sample. A match relation, at step 3008, is created to describe the details of how many nodes matched each region's pattern for a chosen analysis sample, and in one embodiment, the specifics of each node that matched. In one embodiment, the match relation against a snapshot g for a pattern p has the form of r_g(p) and two attributes that aggregate over all matched nodes: the number of matches r_g(p).numMatches and the count of nodes owned by those matches r_g(p).owned Count. Optionally, additional properties are added that describe greater detail about the individual nodes that matched a region's pattern. For example, if the matched nodes are each Documents, then an embodiment may record the size of the Documents, or other traits specific to the domain of Documents. This additional, per-matched-node information can be useful in two ways. First, it can help a user of the tool in understanding how the program behaves (e.g. the Documents added recently have different properties than ones added earlier). Second, the additional per-matched-node information allows for a finer understanding of how its memory evolves (e.g. even though the program is uses no more than 100 Documents, the Documents themselves appear to change over time).

The environment analyzing tool 110, at step 3010, determines whether a suspicious evolutionary property is evident based on a set of match relations. For example, the environment analyzing tool 110 might determine based on the set of match relations that a region is growing without bound. In a Java program, this could lead to a memory leak. If the result of this determination is positive, the patterns, at step 3012, are prioritized depending on the severity of the evolution. For example, a pattern estimating a memory leak, in one embodiment is given a higher prioritization than a less severe evolution. The report generator, at step 3014, identifies specific patterns for a particular evolution and reports these patterns to a user. For example, a report generator for Java memory leaks identifies patterns p such that the temporally-ordered snapshots, for example, analysis snapshots $g_1$ to $g_n$, r_gl(p).numMatches increases monotonically. The control flow then exits at step 3016. If the result of this determination is negative, the control flow exits at step 3018.

Another advantage of the present invention is that minimal information is needed to generate accurate patterns of how an environment is evolving. For example, the age of a node is no longer needed to analyze the evolution of the environment. The problems discussed above regarding assuming and enforcing persistent node identities are avoided by only needing to consider persistent node types. Overhead is lessened by comparing summaries of graphs and not having to compare the actual graphs. For example, a prior art technique known as solving the "subgraph isomorphism" problem seeks to determine whether one graph can be found within another. As stated above, comparing actual graphs is expensive. The present invention, on the other hand, finds the patterns that describe how a graph evolves over multiple instances, thereby reducing system overhead.

The foregoing embodiments of the present invention are advantageous because they provide automated analysis of a program. For example, the steps in FIGS. 6–10 are performed automatically without any interaction by a user and require no explicit training. The embodiments of the present invention further enable the virtual machine 112 to exploit profiling data earlier in a program's execution and enables feedback-directed optimization over the life of the application rather than just a single execution. The profile data collected while a program executes persists across multiple runs of that program allowing the virtual machine to learn from these prior runs instead of starting from scratch every time the program executes.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for identifying at least one evolving region in a graph of interrelated nodes representing an evolving computer system environment, the method using an information processing system comprising:
generating a series of samples of an evolving computer system environment, each sample in the series of samples including a plurality of interrelated nodes and at least one edge classified into a plurality of at least one of a node type and an edge type, respectively;
creating a summary of the plurality of interrelated nodes and at least one edge in the series of samples, the summary summarizing at least one of all node types and all edge types in the series of samples;
creating an instance of the summary for each sample by summarizing at least one of all of the node types and the edge types for each sample in the series;
storing at least one instance of the created instances of the summary;
comparing at least one instance of the summary to at least one subsequent instance of the summary;
storing at least one result from comparing the instances of the summary; and
associating at least one sample of the evolving computer system environment with the at least one stored comparison result to characterize a successive behavior of the evolving computer system environment for one or more of the at least one of the node type and the edge type.

2. The method of claim 1, further comprising:
determining at least one pattern, based on the successive behavior which has been characterized for the one or more of the at least one of the node type and the edge type, that estimates how at least one region in the evolving computer system environment comprising the plurality of interrelated nodes is evolving.

3. The method of claim 2, wherein the determining at least one pattern further comprises:
finding a border, in the series of samples, between nodes of a first category that are non-evolving and nodes of a second category that are at least one of possibly evolving and evolving.

4. The method of claim 2, further comprising:
determining additional patterns in a neighborhood around a node identified as a maybe-grower.

5. The method of claim 2, further comprising:
generating at least two analysis samples of the evolving computer system environment;
matching the at least one pattern against each analysis sample, wherein the matching further comprises:
relating at least two attributes of matches in the analysis sample being matched against the at least one pattern; and
determining a match relation for the analysis sample being matched with the at least one pattern;
determining, based on the match relation for each matched analysis sample and pattern, at least one evolutionary property for a region in the evolving computer system environment; and
reporting, to a user, a set of patterns displaying the determined evolutionary property which has been determined for a corresponding region in the evolving computer system environment.

6. The method of claim 1, further comprising:
categorizing at least one the node types and edge types, based on the successive behavior which has been characterized for the one or more of the at least one of the node type and the edge type, as one of a non-grower, a maybe-grower, and a definite-grower.

7. The method of claim 1, further comprising:
analyzing at least two nodes in a sample of the evolving computer system environment;
locating a set of nodes that are related to each other;
identifying related nodes as being correlated if every instance of a first related node points to a second related node in every sample of the computer system environment.

8. The method of claim 1, wherein the evolving computer system environment is one of:
a memory usage in an executing program;
a computational resource in an executing program; and
a computational resource in a computer network.

9. The method of claim 1, wherein the summary is one of:
a histogram by node type; and
a histogram by edge-type.

10. An information processing system used for estimating how regions in a graph of interrelated nodes representing an evolving computer system environment are evolving, the information system comprising:
a memory;
an information processing unit communicatively coupled to the memory;
an environment analyzing tool communicatively coupled to the memory and the information processing unit, the environment analyzing tool comprising:
a sample generator for generating a series of samples of an evolving computer system environment, wherein at least one sample in the series is stored in the memory;
a node classifier for classifying a plurality of interrelated nodes in each of the samples into a plurality of at least one of a node type and an edge type;
a summarizer for creating a summary of the plurality of interrelated nodes and at least one edge for the series of samples, wherein the summary is stored in the memory;
a comparator for comparing at least one instance of the summary to at least one subsequent instance of the summary; and
a pattern generator for determining at least one pattern of evolution of at least one region in the evolving computer system environment based on at least the summary of the plurality of interrelated nodes and the at least one edge for the series of samples.

11. The information processing system of claim 10, wherein the environment analyzing tool further comprises:
a reporter for reporting the at least one pattern of evolution to a user.

12. The information processing system of claim 10, wherein the evolving computer system environment is at least one of:
a memory usage in an executing program;
a computational resource in an executing program;
a computational resource in a computer network.

13. The information processing system of claim 10, wherein the summary is one of:
a histogram by node type; and
a histogram by edge-type.

14. The information processing system of claim 10, wherein the environment analyzing tool further comprises:
a pattern matcher for matching the at least one pattern against at least two analysis samples, the pattern matcher determining a match relation for the analysis sample being matched with the at least one pattern for identifying at least one evolutionary property for a region in the evolving computer system environment.

15. A computer readable medium including computer instructions for identifying at least one evolving region in a graph of interrelated nodes representing an evolving computer system environment, the computer readable medium comprising computer instructions for:

generating a series of samples of an evolving computer system environment, each sample in the series of samples including a plurality of interrelated nodes and at least one edge classified into a plurality of at least one of a node type and an edge type, respectively;

creating a summary of the plurality of interrelated nodes and at least one edge in the series of samples, the summary summarizing at least one of all node types and all edge types in the series of samples;

creating an instance of the summary for each sample by summarizing at least one of all of the node types and the edge types for each sample in the series;

storing at least one instance of the created instances of the summary;

comparing at least one instance of the summary to at least one subsequent instance of the summary;

storing at least one result from comparing the instances of the summary; and associating at least one sample of the evolving computer system environment with the stored comparison results to characterize a successive behavior of the evolving computer system environment for one or more of the at least one of the node type and the edge type.

16. The computer readable medium of claim 15, further comprising instructions for:

determining at least one pattern, based on the successive behavior which has been characterized for the one or more of the at least one of the node type and the edge type, that estimates how at least one region in the evolving computer system environment comprising the plurality of interrelated nodes is evolving.

17. The computer readable medium of claim 16, wherein the determining at least one pattern instructions further comprises instructions for:

finding a border, in the series of samples, between nodes of a first category that are non-evolving and nodes of a second category that are at least one of possibly evolving and evolving.

18. The computer readable medium of claim 16, further comprising instructions for:

determining additional patterns in a neighborhood around a node identified as a maybe-grower.

19. The computer readable medium of claim 16, further comprising instructions for:

generating at least two analysis samples of the evolving computer system environment;

matching the at least one pattern against each analysis sample, wherein the matching further comprises:

relating at least two attributes of matches in the analysis sample being matched against the at least one pattern; and determining a match relation for the analysis sample being matched with the at least one pattern;

determining, based on the match relation for each matched analysis sample and pattern, at least one evolutionary property for a region in the evolving computer system environment; and reporting, to a user, a set of patterns displaying the determined evolutionary property which has been determined for a corresponding region in the evolving computer system environment.

determining at least one pattern, based on the successive behavior which has been characterized for the one or more of the at least one of the node type and the edge type, that estimates how at least one region in the evolving computer system environment comprising the plurality of interrelated nodes is evolving.

20. The computer readable medium of claim 15, further comprising instructions for:

categorizing at least one of the node types and edge types, based on the successive behavior which has been characterized for the one or more of the at least one of the node type and the edge type, as one of a non-grower, a maybe-grower, and a definite-grower.

* * * * *